US012665934B2

(12) United States Patent
Rund et al.

(10) Patent No.: US 12,665,934 B2
(45) Date of Patent: Jun. 23, 2026

(54) CYBERSECURITY AI-DRIVEN WORKFLOW GENERATION USING POLICIES

(71) Applicant: Arctic Wolf Networks, Inc., Eden Prairie, MN (US)

(72) Inventors: Lance Rund, San Jose, CA (US); Matthew James Aguiar, Winter Garden, FL (US); Joshua McCarthy, Morgan Hill, CA (US); David B McKinley, Dartmouth, MA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 105 days.

(21) Appl. No.: 18/735,588

(22) Filed: Jun. 6, 2024

(65) Prior Publication Data

US 2024/0414204 A1    Dec. 12, 2024

Related U.S. Application Data

(60) Provisional application No. 63/471,278, filed on Jun. 6, 2023.

(51) Int. Cl.
*H04L 9/40*    (2022.01)
(52) U.S. Cl.
CPC .................................. *H04L 63/20* (2013.01)
(58) Field of Classification Search
CPC ...................................................... H04L 63/20
See application file for complete search history.

(56) References Cited

U.S. PATENT DOCUMENTS

| 11,882,148 | B1* | 1/2024 | Hagen | ................. | H04L 63/1441 |
| 2019/0132214 | A1* | 5/2019 | Porras | ..................... | H04L 63/20 |
| 2020/0244696 | A1* | 7/2020 | Thomas | .............. | H04L 63/1441 |
| 2023/0188561 | A1* | 6/2023 | Finkelshtein | ....... | H04L 63/1408 726/22 |

* cited by examiner

*Primary Examiner* — Noura Zoubair
(74) *Attorney, Agent, or Firm* — Barnes & Thornburg LLP

(57) ABSTRACT

Disclosed embodiments provide techniques for cybersecurity AI-driven workflow generation using policies. A set of cybersecurity threat protection applications is accessed and managed by a security orchestration, automation, and response (SOAR) platform. The cybersecurity threat protection applications are deployed across a managed cybersecurity network. One or more cybersecurity network compliance requirements are assimilated into the SOAR platform by translating the compliance requirements into one or more cybersecurity application policies and work processes. The assimilation is accomplished using an AI user interface with natural language processing. The cybersecurity application policies provide conformity with the compliance requirements. The application policies generate one or more cybersecurity application workflows for the managed cybersecurity network. The SOAR platform executes the cybersecurity workflow. The workflow is enabled by an embedded universal data layer that maps the cybersecurity threat protection application inputs and outputs to the SOAR platform.

20 Claims, 9 Drawing Sheets

OBTAIN TRAINING DATASET
660

APPLY TRAINING DATA TO NN
665

ADJUST WEIGHT(S)
670

PROMOTE TRAINED NN TO PRODUCTION NN
675

604

OUTPUT
656

NODE N
650

WEIGHT
654

INPUT
652

602

CYBERSECURITY AI-DRIVEN WORKFLOW GENERATION USING POLICIES

CROSS REFERENCE TO RELATED APPLICATIONS

This application claims the priority benefit of U.S. Provisional Patent Application No. 63/471,278, filed Jun. 6, 2023, which is incorporated herein by reference in its entirety.

FIELD OF ART

This application relates generally to cybersecurity management and more particularly to cybersecurity AI-driven workflow generation using policies.

BACKGROUND

Compliance programs are an integral part of businesses, cybersecurity management systems, other management systems, and government organizations. As business environments become increasingly regulated, organizations must not only maintain compliance programs, but demonstrate that the programs are effective and exercise a reasonable amount of oversight. There are several elements that may be recognized as essential to compliance programs. For example and first, a code of conduct that is consistent with its business environment must be established. Standards, procedures, and controls must be created, reviewed, approved, and distributed to employees in a consistent and structured manner. Second, management across the organization must work to ensure the established code of conduct is communicated consistently to the employees. Third, checks and balances within the policy creation process must be in place to ensure that policies are not being created to satisfy personal interests. Fourth, the code of conduct must be distributed and acknowledged by all employees and training must be provided to ensure comprehension and compliance. Fifth, mechanisms must be in place to allow the employer the ability to prove employee comprehension of the applicable code of conduct in the event of an incident or audit. Sixth, the employer must consistently enforce the code of conduct and take appropriate disciplinary action for violations. Finally, responses to incidents must be consistent across the organization. Managers must respond similarly and appropriately to cases in which policies are broken. These elements have become increasingly important, and in many cases, increasingly difficult to maintain as more regulatory, compliance, audit, and company policies are generated and updated. Many organizations dedicate significant staff resources in an effort to understand and apply internal and external regulatory and compliance rules in a consistent manner. This challenge may continue as businesses grow and their reach into marketplaces across the globe expands.

SUMMARY

The disclosed systems, methods, techniques, and technology provide cybersecurity management techniques, including generating and executing cybersecurity workflows using a combination of an artificial intelligence (AI) platform, various cybersecurity policies, and machine learning (ML) models. Digital computer systems and networks are an integral part of daily life at the personal and professional level. Many organizations, large and small, may be dependent on information technology platforms. As computer, information technology, and network infrastructures evolve and expand, the ability to access vital digital services and programs grows as well, as do requirement to secure these systems and infrastructure. Cybersecurity threats also continue to grow in volume and complexity. Denial-of-service attacks, for example, are recorded in the millions annually, while data breaches number in the thousands across the globe, resulting in billions of data records being stolen. In response to these cybersecurity threats, organizations may use multiple layers of network security and protection applications in an effort to prevent, detect, and respond to the cybersecurity threats. At the same time, internal and external organizations may work to establish standards, policies, and procedures for dealing with the cybersecurity threats and to maintain consistent and effective ways of dealing with incidents when they occur. With many different cybersecurity threat protection applications and many different regulations, rules, policies, and procedures coming from inside and outside sources, generating and maintaining consistent and effective cybersecurity policies for security software systems is becoming increasingly challenging. The disclosed technology can provide automated, AI, and ML based techniques for generating and executing cybersecurity workflows and management for different organizations, entities, users, computer systems, networks, and/or other information technology infrastructures.

One or more embodiments described herein can include a computer-implemented method for cybersecurity management including: accessing a group of cybersecurity threat protection applications, the group of cybersecurity threat protection applications being deployed across a managed cybersecurity network, and the cybersecurity threat protection applications being managed using a security orchestration, automation, and response (SOAR) platform, assimilating, based on receiving user inputs in an artificial intelligence (AI) user interface, one or more cybersecurity network compliance requirements into the SOAR platform, translating, using a machine learning (ML) model, the one or more cybersecurity network compliance requirements into one or more cybersecurity policies, the ML model having been trained using data gathered by one or more instantiations of the SOAR platform, and the one or more cybersecurity policies providing cybersecurity network conformity with the compliance requirements, generating a cybersecurity workflow for the managed cybersecurity network, based on the one or more cybersecurity policies, and executing the cybersecurity workflow, using the SOAR platform.

The method can include one or more of the following features. For example, the compliance requirements can be based on one or more of compliance standards, regulatory requirements, company policy documents, company incident response documents, and company industry segment standards. The AI user interface can include a natural language AI user interface. The natural language AI user interface can be embedded in the SOAR platform. The natural language AI user interface can be accessed by an application program interface (API) in the SOAR platform. The natural language AI user interface can be accessed by a user providing text input or voice input in the AI user interface. The ML model can be embedded in the SOAR platform. The ML model can be accessed through an API in the SOAR platform.

In some implementations, the method may also include augmenting the translating based on input received from an endpoint device of a cybersecurity representative. The method can include augmenting the translating based on input received from an endpoint device that may include publicly available cybersecurity threat applications. The method can include augmenting the translating based on input received from an endpoint device that may include company policy documentation. Sometimes, generating the cybersecurity workflow can be further based on applying another ML model to the one or more cybersecurity policies. The other ML model can be embedded in the SOAR platform. The other ML model can be trained using data gathered by the one or more instantiations of the SOAR platform.

As another example, generating the cybersecurity workflow can be enabled by an embedded universal data layer having two or more cybersecurity threat protection application mappings. A first mapping of the two or more cybersecurity threat protection application mappings can include a transformation of outputs of each of the group of cybersecurity threat protection applications. A second mapping of the two or more cybersecurity threat protection application mappings can include a transformation of inputs of each of the group of cybersecurity threat protection applications. The method may also include tagging a cybersecurity incident based on executing the cybersecurity workflow. The tagging may identify a mismatch between the cybersecurity incident and a compliance requirement. The cybersecurity workflow may include instructions to perform operations including: managing one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and/or end-to-end incident lifecycle case management.

One or more embodiments described herein can include a computer-implemented method for cybersecurity management including: accessing a group of cybersecurity threat protection applications, where the group of cybersecurity threat protection applications can be deployed across a managed cybersecurity network, and where the cybersecurity threat protection applications can be managed using a security orchestration, automation, and response (SOAR) platform; assimilating one or more cybersecurity network compliance requirements into the SOAR platform; translating the one or more cybersecurity network compliance requirements into one or more cybersecurity policies, the one or more cybersecurity policies providing cybersecurity network conformity with the compliance requirements; generating a cybersecurity workflow for the managed cybersecurity network, based on the one or more cybersecurity policies; and executing the cybersecurity workflow, using the SOAR platform. A computer program product embodied in a non-transitory computer readable medium for cybersecurity management can include code which may cause one or more processors to perform operations including: accessing a group of cybersecurity threat protection applications, the group of cybersecurity threat protection applications being deployed across a managed cybersecurity network, and the cybersecurity threat protection applications being managed using a security orchestration, automation, and response (SOAR) platform; assimilating one or more cybersecurity network compliance requirements into the SOAR platform; translating the one or more cybersecurity network compliance requirements into one or more cybersecurity policies, the one or more cybersecurity policies providing cybersecurity network conformity with the compliance requirements; generating a cybersecurity workflow for the managed cybersecurity network, based on the one or more cybersecurity policies; and executing the cybersecurity workflow, using the SOAR platform.

In further embodiments, a computer system for cybersecurity management can be provided including: a memory which stores instructions; one or more processors attached to the memory, the one or more processors, when executing the instructions which are stored, being configured to: access a group of cybersecurity threat protection applications, the group of cybersecurity threat protection applications being deployed across a managed cybersecurity network, and the cybersecurity threat protection applications being managed using a security orchestration, automation, and response (SOAR) platform; assimilate one or more cybersecurity network compliance requirements into the SOAR platform; translate the one or more cybersecurity network compliance requirements into one or more cybersecurity policies, the one or more cybersecurity policies providing cybersecurity network conformity with the compliance requirements; generate a cybersecurity workflow for the managed cybersecurity network, based on the one or more cybersecurity policies; and execute the cybersecurity workflow, using the SOAR platform.

The embodiments described herein may include one or more of the following features. For example, the compliance requirements can be based on one or more of compliance standards, regulatory requirements, company policy documents, and company incident response documents. The compliance requirements can be based on company industry segment standards. The assimilating can be performed by using an artificial intelligence (AI) user interface. The AI user interface can include a natural language AI user interface. The natural language AI user interface can be embedded in the SOAR platform. The natural language AI user interface can be accessed by an application program interface (API) in the SOAR platform. The natural language AI user interface can be accessed using text. The natural language AI user interface can be accessed using voice. The AI user interface can be engaged by a cybersecurity representative.

As another example, the assimilating may include input from a compliance engine audit tool. The translating can be performed using machine learning (ML). The ML can be embedded in the SOAR platform. The ML can be trained by data gathered by one or more instantiations of the SOAR platform. The ML can be accessed through an application program interface (API) in the SOAR platform.

In some implementations, the embodiments can also include augmenting the translating using input from a cybersecurity representative. The input can be obtained using a natural language artificial intelligence user interface. The embodiments can include augmenting the translating using input from publicly available cybersecurity threat applications. The embodiments an include augmenting the translating using input from company policy documentation. The generating a cybersecurity workflow can be performed using machine learning (ML). The ML can be embedded in the SOAR platform. The ML can be trained by data gathered by one or more instantiations of the SOAR platform. The generating a cybersecurity workflow can be enabled by an embedded universal data layer including two or more cybersecurity threat protection application mappings. A first mapping of the two or more cybersecurity threat protection application mappings can include a transformation of outputs of each of the group of cybersecurity threat protection applications. A second mapping of the two or more cybersecurity threat protection application mappings can include a transformation of inputs of each of the group of cybersecurity threat protection applications. The embodiments described herein can include tagging a cybersecurity incident, based on the executing the cybersecurity workflow. The tagging can identify a mismatch with a compliance requirement. Sometimes, the cybersecurity workflow can include managing one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and/or end-to-end incident lifecycle case management.

One or more embodiments described herein can include a computer-implemented method for cybersecurity management including: accessing a group of cybersecurity threat protection applications, the group of cybersecurity threat protection applications being deployed across a managed cybersecurity network, and the cybersecurity threat protection applications being managed using a security orchestration, automation, and response (SOAR) platform, assimilating, based on receiving user inputs in an artificial intelligence (AI) user interface, one or more cybersecurity network compliance requirements into the SOAR platform, translating, using a machine learning (ML) model, the one or more cybersecurity network compliance requirements into one or more cybersecurity policies, the ML model having been trained using data gathered by one or more instantiations of the SOAR platform, and the one or more cybersecurity policies providing cybersecurity network conformity with the compliance requirements, generating a cybersecurity workflow for the managed cybersecurity network, based on the one or more cybersecurity policies, and executing the cybersecurity workflow, using the SOAR platform.

The method can optionally include one or more of the following features. For example, the compliance requirements can be based on one or more of compliance standards, regulatory requirements, company policy documents, company incident response documents, and company industry segment standards. The AI user interface can include a natural language AI user interface. The natural language AI user interface can be embedded in the SOAR platform. The natural language AI user interface can be accessed by an application program interface (API) in the SOAR platform. The natural language AI user interface can be accessed by a user providing text input or voice input in the AI user interface. The ML model can be embedded in the SOAR platform. The ML model can be accessed through an API in the SOAR platform.

In some implementations, the method may also include augmenting the translating based on input received from an endpoint device of a cybersecurity representative. The method may include augmenting the translating based on input received from an endpoint device that includes publicly available cybersecurity threat applications. The method can include augmenting the translating based on input received from an endpoint device that may include company policy documentation. Sometimes, generating the cybersecurity workflow can be further based on applying another ML model to the one or more cybersecurity policies. The other ML model can be embedded in the SOAR platform. The other ML model can be trained using data gathered by the one or more instantiations of the SOAR platform.

Sometimes, generating the cybersecurity workflow can be enabled by an embedded universal data layer having two or more cybersecurity threat protection application mappings. Sometimes, a first mapping of the two or more cybersecurity threat protection application mappings can include a transformation of outputs of each of the group of cybersecurity threat protection applications. A second mapping of the two or more cybersecurity threat protection application mappings may include a transformation of inputs of each of the group of cybersecurity threat protection applications. Sometimes, the method may also include tagging a cybersecurity incident based on executing the cybersecurity workflow. The tagging may identify a mismatch between the cybersecurity incident and a compliance requirement. The cybersecurity workflow may include instructions to perform operations including: managing one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and/or end-to-end incident lifecycle case management.

The disclosed technology can provide one or more advantages as described throughout this disclosure. For example, the disclosed technology can use AI, ML, and natural language processing techniques to enable SOARs platform to converse programmatically with cybersecurity threat protection applications, interpret their data, respond to their input, and manage tasks undertaken by the applications as they react to cybersecurity events.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
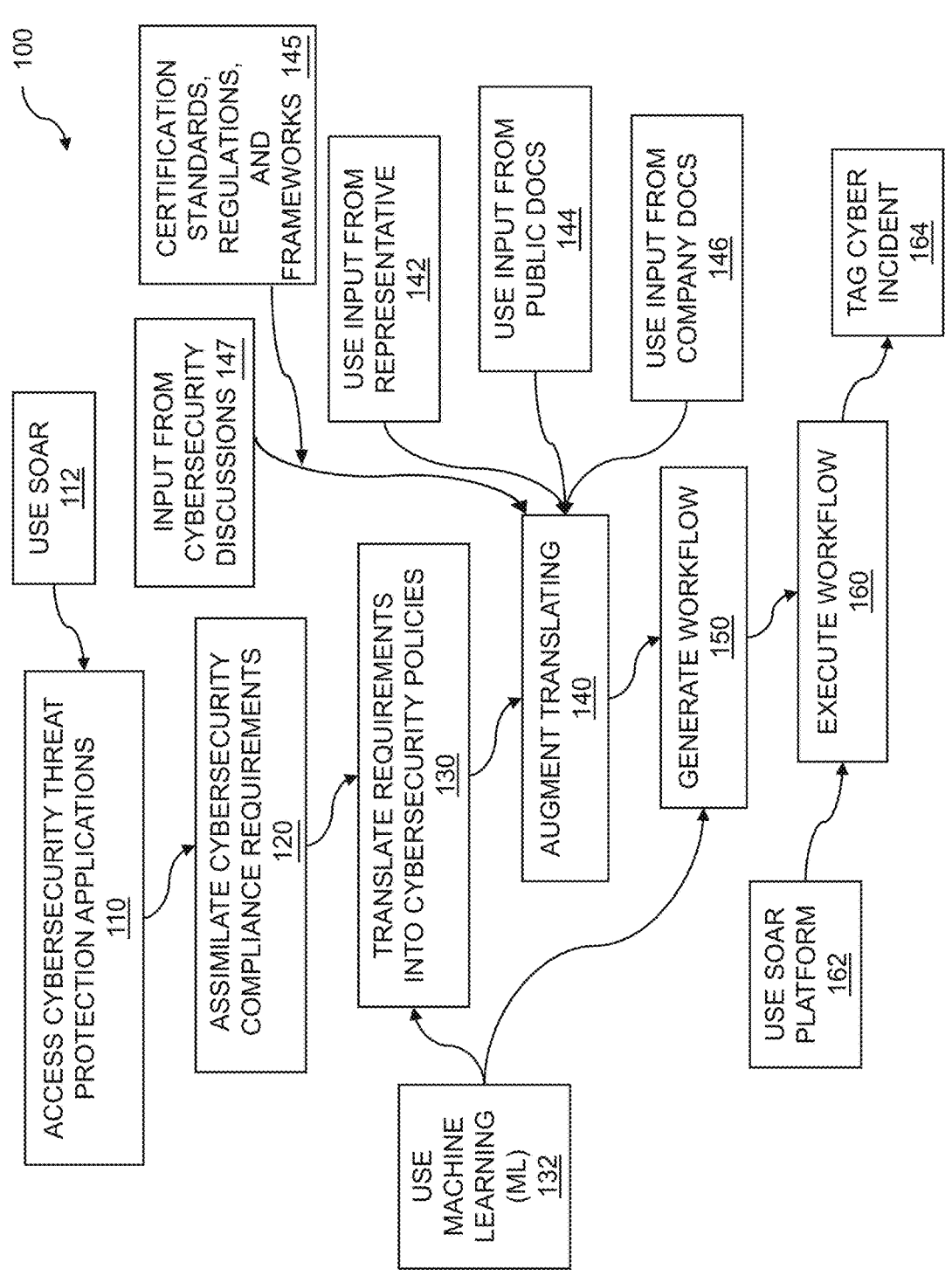
FIG. 1 is a flow diagram for cybersecurity AI-driven workflow generation using policies.

Modern information networks are under constant threat from various criminal enterprises across the country or in many cases, across the globe. Unfortunately, attacks from within the organization can be as threatening and as damaging as those from outside the organization. Attacks can come from individual criminals, gangs, and organized crime; expert hackers sponsored and protected by enemy and rogue governments; and terrorists and extortionists; among many others with malicious intent. The attacks are directed at businesses, government agencies, hospitals, research laboratories, retailers, universities, and other enterprises and organizations. Cybersecurity monitoring systems reveal that cybersecurity threats such as cyberattacks, phishing expeditions, and attempted data theft or destruction can occur as often as every few seconds. Frequently targeted enterprises include those from sectors such as high technology, finance, retail, and government agencies including defense, air traffic control, and revenue. These sectors are attacked because of their high value data and their potential to execute large financial payouts. Other high-value targets include media companies who are called out by detractors for allegedly insulting a religion or humiliating national leaders. National infrastructures such as pipelines and energy grids are targets because of the disruption caused by their being disabled or interrupted. Small businesses and private individuals are under no less threat by cyberattackers of every form. Identity theft, fraud, hacking of financial accounts or medical data, database breaches, ransomware, and so on plague businesses, families, and individuals daily across the globe.

Cybersecurity applications and services to help organizations and individuals protect and defend against cyberattacks abound. However, these applications can be complicated to manage and require routine maintenance in order to keep abreast of the most recent attacks. Small businesses can often require several different security systems or services to fully protect their systems. In some cases, the cybersecurity application components do not work well with one another, can overlap, or can even conflict, so that management of the various applications becomes a challenge. Large organizations have even more complications to address. Along with multiple cybersecurity protection applications, ensuring that all users have the most recent versions of applications installed and running can be a task requiring both software monitoring and support staff resources. Even industry specialists use sophisticated management applications to monitor the many and varied security tools running within their network environments.

In addition to the technical challenges of managing and coordinating cybersecurity applications, regulatory, compliance, and audit requirements from inside and outside the organization add more complexity. Understanding the many and varied rules, regulations, and policy requirements generated by government, industry, and internal bodies can require hours of effort, as well as constant refreshing as responses to new risk arise. Translating the combined rules and regulations into application policies, workflows, and settings that can be applied to the numerous cybersecurity applications used by modern IT networks can be a significant challenge as well. As the number of cyberattacks increase and the requirements to validate successful mitigation steps become more complex, better technologies and methods are required.

Techniques for cybersecurity AI-driven workflow generation using policies are depicted and described herein. Cybersecurity application management can be accomplished through the creation and maintenance of application policies workflows generated by AI-driven models that consider the data requirements of the applications and the compliance requirements that apply to the network environment. A plurality of network-connected cybersecurity threat protection applications is accessed. The threat protection applications include endpoint protection, anti-phishing and antivirus tools, firewalls, denial-of-service sensing, ransomware detection, and so on. The threat protection applications are managed using a security orchestration, automation, and response (SOAR) platform, sometimes simply referred to as a SOAR. An AI user interface comprised of a natural language processing (NLP) user interface is used to assimilate cybersecurity network compliance requirements from inside and outside the organization. The AI user interface can take in compliance requirements through an API, text input, or audio input. Two-way communication between the cybersecurity threat protection applications can be accomplished using an AI machine learning model that considers the capabilities of each of the applications and generates settings and workflows in order to best respond to various cybersecurity incidents. The network compliance data received through the AI user interface is combined with the cybersecurity threat protection application data so that the machine learning model can generate policies and workflows for the applications that respond to cybersecurity events in a manner consistent with the applicable network compliance standards. The SOAR platform tags cybersecurity incidents as they are logged by a threat and vulnerability management system, and checks to see that the responses of the threat protection applications meet the network compliance standards. In cases where the compliance standards are not met, the machine learning model generates corrective actions to adjust the threat protection policies and workflows to bring them into compliance.

FIG. 1 is a flow diagram 100 for cybersecurity AI-driven workflow generation using policies. The flow 100 can include accessing a plurality of network-connected cybersecurity threat protection applications 110, wherein the plurality of cybersecurity threat protection applications is deployed across a managed cybersecurity network, and wherein the cybersecurity threat protection applications are managed using a security orchestration, automation, and response (SOAR) platform. Threat protection applications can monitor, protect, and defend computer systems, data systems, data networks, handheld electronic devices, and so on against various types of malicious attacks. Malicious attacks can include malware attacks, hacking attacks, denial-of-service attacks (DoS), distributed denial-of-service attacks (DDoS), man-in-the-middle attacks, ransomware attacks, and so on. The threat protection applications can include antivirus and anti-phishing applications, tools for threat hunting and threat intelligence, identity verification, endpoint protection, and so on. The threat applications can further include firewalls and other blocking technology.

Threat protection applications can be used to provide a variety of protections and defenses for computer systems, data systems, data networks, endpoint devices, etc. The threat protection applications can be installed on the various network-based IT components to counter the increasing variety of malicious cyberattacks. The threat protection applications can include antivirus, anti-phishing, and anti-cryptojacking applications; tools for threat hunting and threat intelligence; identity verification; endpoint protection; forensic investigation; incident management; and so on. In embodiments, the plurality of cybersecurity threat protection applications can include a security orchestration, automation, and response (SOAR) platform 112. The SOAR platform 112 can be configured to enable the management and maintenance of the cybersecurity threat protection applications, coordinate the coverage of the applications across the network, and/or handle the analysis and mitigation of cybersecurity events as they occur. The SOAR platform can enable data collection from a wide range of data sources such as threat data sources using an artificial intelligence (AI) user interface. The threat data sources can include data uploaded by cybersecurity experts, data produced by cybersecurity threat protection applications, and so on. The SOAR platform can be used to manage threat protection processes, anti-threat technologies, and human expertise. The SOAR platform can centralize management of IT assets such as networks, processors, data storage elements, etc. The SOAR platform can provide threat alerts and can also provide contexts for the alerts. The SOAR platform can further automate responses to threats, adapt the responses using machine learning, and so on.

The flow 100 can include assimilating one or more cybersecurity compliance requirements 120 into the SOAR platform. Sometimes, the compliance requirements may include network compliance requirements, endpoint security policies and/or requirements, frameworks, human resources (HR) records, law enforcement records, insurance requirements, data backup requirements of cybersecurity policies, data management requirements, etc. In embodiments, the compliance requirements can be based on one or more compliance standards, regulatory requirements, company policy documents, and company incident response documents. The compliance requirements can be based on company industry segment standards. Across most if not all governments, businesses, and industries, regulatory bodies work to set and maintain cybersecurity standards for their members. Governments at the federal, state, and local levels all strive to maintain cybersecurity regulations and policies for themselves and the private entities under their control. Regulatory bodies routinely publish and update policies and standards as cybersecurity threats increase and evolve. Audit companies specializing in cybersecurity work with internal audit and compliance departments to review, improve, and maintain cybersecurity standards, policies, and practices within companies large and small. Small businesses and private individuals can subscribe to cybersecurity services and purchase hardware and software that can help to mitigate the threats to their data, applications, and hardware, as well as their finances. With the ever-changing cybersecurity threats across the internet and within private networks, IT departments are faced with significant challenges to interpret and assimilate the many and varied regulatory and compliance requirements for their computer systems.

In order to assimilate the relevant IT network compliance requirements, the assimilating can be performed by using an artificial intelligence (AI) user interface, wherein the AI user interface comprises a natural language AI user interface. Natural language processing (NLP) is a field of computer science, artificial intelligence (AI) and linguistics that deals with the interactions between human language and computers. The purpose of the NLP and AI can be to provide computers with the ability to understand, generate, manipulate, and respond to text and speech data in natural human languages. NLP uses rule-based and statistical models, as well as machine learning and deep learning techniques, to process and analyze large amounts of natural language data. In recent years, advances in data grouping and summarization have allowed massive amounts of human text and speech to be fed into very large databases used by machine learning models to analyze and generate human language. AI chat platforms are continually improving the ability to replicate human text and speech in a more natural manner.

In embodiments, the natural language AI user interface can be embedded in the SOAR platform, wherein the natural language AI user interface is accessed by an application program interface (API) in the SOAR platform. An application program interface (API) can be a set of programs and rules that allow different applications to exchange information. It can act as an intermediate layer that processes data between systems, allowing application data and functionality to extend to third-party developers as well as to internal departments within the same network. In embodiments, one or more APIs can be used to accept data from the one or more cybersecurity threat protection applications into the natural language AI user interface. The API can also be used to send requests for data and commands to the cybersecurity threat protection applications. The natural language AI user interface can be accessed using text and/or voice. The natural language AI user interface can be engaged by a cybersecurity representative. The assimilating can include input from a compliance engine audit tool. A compliance engine audit tool can be a set of applications that can interrogate cybersecurity applications to generate reports and gather data in order to determine how a cybersecurity application responds to various conditions in the network, and can review the settings that are in place within the application. These settings can be compared to compliance policies in the compliance audit tool database. Interpreting the network compliance requirements can be done by inputting text from regulatory and compliance documentation, internal company policy documents, audit findings, incident reports, and so on. The input can be done verbally or in written word. Input from the cybersecurity threat protection applications can use the API into the natural language AI user interface as well. The input from all of these sources into the database of the AI user interface can enable the SOAR platform to converse programmatically with the cybersecurity threat protection applications, interpret their data, respond to their input, and manage the tasks undertaken by the applications as they react to cybersecurity events.

The flow 100 can include translating the one or more cybersecurity network compliance requirements into one or more cybersecurity policies 130, wherein the one or more cybersecurity policies provide cybersecurity network conformity with the compliance requirements. As mentioned above and throughout, inputting the various compliance, regulatory, and company policy statements regarding cybersecurity standards and responses into a natural language AI user interface can allow the SOAR platform to interpret the requirements for the threat protection applications installed on the managed cybersecurity network. The AI user interface, as described herein, can include a user interface that incorporates AI features and techniques to provide relevant prompts, feedback, and/or information to a user interacting with the user interface. Sometimes, the user interfaces described herein can leverage AI algorithms, techniques, and/or features to efficiently and accurately process inputs provided by a user as described herein. Input from the cybersecurity threat protection applications via the API can allow the SOAR platform to interact with the applications. In embodiments, translating the network compliance requirements into workflow policies, procedures, and processes that the threat protection applications can implement can be performed using machine learning (ML) 132. The ML can be embedded in the SOAR platform 112, wherein the ML is trained by data gathered by one or more instantiations of the SOAR platform. The ML can be accessed through an application program interface (API) in the SOAR platform. A machine learning (ML) model can be built using compliance and regulatory data from the natural language AI user interface and data from the cybersecurity threat protection applications input through one or more APIs.

The translating of the compliance and regulatory rules and requirements into cybersecurity threat protection policies, rules, and settings by the ML model can be augmented 140 by user input from a cybersecurity representative 142 (e.g., customer and/or entity using the disclosed technology), from public documents 144 (e.g., publicly available cybersecurity threat applications, contractual requirements, other static documents), from company policy documentation 146 (e.g., cybersecurity policies, contracts with specific customers), from certifications, standards, regulations, and/or frameworks 145 (which can include public and/or private documentation), and/or from cybersecurity discussions 147 (e.g., news outlets, media outlets, forums, other dynamic documents). As cybersecurity events occur, either within a managed cybersecurity network or on other similar networks across the globe, incident reports in various forms are published by threat protection application vendors, regulatory agencies, auditors, watchdog agencies, internal audit and compliance departments, IT departments, and so on. Any of this input can be used to update and refine the translation of network compliance requirements into policies, rules, and application settings. The input can be introduced into the machine learning model using one or more APIs and/or through the natural language AI user interface.

In embodiments, the result can be to generate a set of application policies, workflows, rules, and settings 150 for each of the cybersecurity threat protection applications that direct the applications to respond to cybersecurity events in a manner that is consistent with the internal and external regulatory and compliance requirements for the network. The generating of the cybersecurity workflows can be performed by the ML model, which can be embedded in the SOAR platform and trained by the data gathered by one or more instantiations of the SOAR platform. The cybersecurity workflows can include managing one or more of anti-virus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and end-to-end incident lifecycle case management. The cybersecurity application policies can include information on how to respond to specific types of threats, how often to report an operational status, how often and when to install updates, whom to notify during priority events, how to notify, and so on. The cybersecurity application policies can include details on which processes are to be handled by the SOAR platform, so that only condition and status data is sent forward to the SOAR platform (or SOAR system), and which processes are to be handled by the application directly, with status data to follow. The policies can include settings on how the application is to proceed in the event that the SOAR platform is unavailable, and so on.

In some embodiments, the generating a cybersecurity workflow can be enabled by an embedded universal data layer having two or more cybersecurity threat protection application mappings. The first mapping of the two or more cybersecurity threat application mappings can include a transformation of outputs of each of the plurality of cybersecurity threat applications. The second mapping of the two or more cybersecurity threat application mappings can include a transformation of inputs of each of the plurality of cybersecurity threat applications. The universal data layer (UDL) can be used to "standardize" data provided to or generated by the cybersecurity threat protection applications. The applications can use different but similar terms to describe or label a threat, an action, a result, and so on. In a usage example, a security threat event such as detection of a virus or trojan can cause one application to generate a signal such as "security threat detected", while a second application can generate a signal such as "virus detected". Since the different labels can be used by the different applications to indicate a substantially similar threat event, the two labels can be standardized. For example, "security threat detected" and "virus detected" can be standardized to "integrity threat" or similar. In embodiments, the SOAR platform can manage cybersecurity for a data network, based on data collected through the first UDL mapping and data transmitted through the second UDL mapping. Management of a data network, information technology (IT) system, and so on, can include executing one or more workflows 160. A workflow can access one or more threat detection applications, swap in and swap out applications, etc. In embodiments, a SOAR platform managing cybersecurity 162 can include graphical control of the plurality of cybersecurity threat protection applications.

The flow 100 can include executing the cybersecurity workflow, using the SOAR platform 162. In embodiments, the executing the cybersecurity workflow can further comprise tagging a cybersecurity incident 164, based on the executing the cybersecurity workflow, wherein the tagging identifies a mismatch with a compliance requirement. As cybersecurity events occur, the cybersecurity threat protection applications can log events and report statuses and actions taken to the SOAR platform. The SOAR platform can respond with additional requests, commands, communications, and so on as the event progresses. Reporting to incident lifecycle applications, updating security personnel, receiving updates from vendors, modifying application behaviors, etc. can also be part of the cybersecurity incident. As the incident progresses, mismatches with established compliance standards and internal policies specific to the enterprise or agency may be revealed, resulting in one or more tags being applied to the recording of the incident in the SOAR platform database. This enables bespoke, non-regulatory policy needs, as well as regulatory/compliance needs, to be addressed. For instance, the response time between the moment a virus can be identified on a workstation and the quarantining of affected data from the workstation may be longer than the compliance standards require, the workstations of the same or similar model to the infected workstation may not all have the most recent version of the virus scanner installed, and so on. Defects in the application policies, processes, applications, or staff responses can be tagged and reported to cybersecurity team members, and audit and compliance officers so that proper follow-up steps are taken, and the cybersecurity threat protection responses are brought into compliance. The event history logs, communications, and reporting can also be added to the ML model database in order to improve the responses and application policies in subsequent events.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
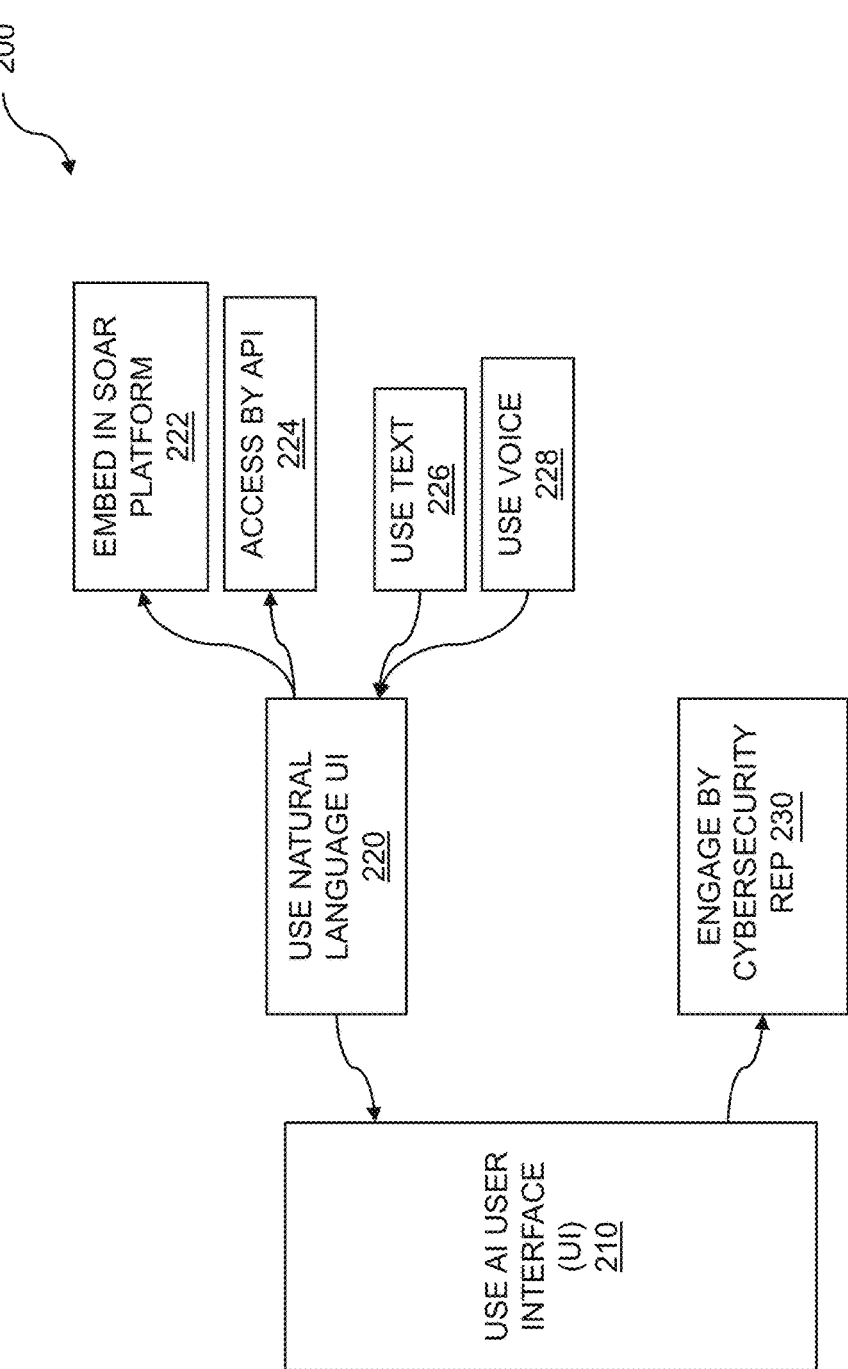
FIG. 2 is a flow diagram for AI user interface usage.

FIG. 2 is a flow diagram 200 for AI user interface usage. As mentioned above and throughout, a plurality of cybersecurity threat protection applications can be deployed across a managed security network. The cybersecurity threat protection application can be managed by a SOAR platform. Cybersecurity network compliance requirements can be assembled from external sources, including government regulatory bodies, industry standards, and best practices recommendations from vendors and industry groups. Internal sources including audit, compliance, and legal departments, company policy documents, and company incident reports from within an organization can also contribute to the generation of compliance requirements for an organization and its cybersecurity network. Text and verbal information from the internal and external sources can be fed into an artificial intelligence (AI) user interface (UI) in order to analyze the contents of the various sources, compare the regulations and compliance standards, and generate software application policies and workflows for the cybersecurity threat protection applications to use in responding to cybersecurity events. The flow 200 can include an artificial intelligence (AI) user interface (UI) 210. An AI user interface can be an interface that uses one or more aspects of artificial intelligence programming to interact with users and, in some cases, other applications. These interfaces have simulated cognitive functions that facilitate interactions between humans and computers. They can be designed to be minimalistic and friendly while providing human-like interactions for the user.

The flow 200 can include a natural language user interface 220 as part of the AI user interface 210. Natural language processing (NLP) can be a field of computer science, artificial intelligence (AI), and linguistics that deals with the interactions between human language and computers. Its goal is to give computers the ability to understand, generate, manipulate, and respond to text and speech data in natural human languages. NLP uses rule-based and statistical models, as well as machine learning and deep learning techniques, to process and analyze large amounts of natural language data. In recent years, advances in data grouping and summarization have allowed massive amounts of human text and speech to be fed into very large databases used by machine learning models to analyze and generate human language. AI user interfaces and chatbots are continually improving the ability to replicate human text and speech in a more natural manner by the use of NLP systems. In embodiments, the AI user interface 210, including the natural language user interface 220, can be embedded in the SOAR platform 222. Building the AI user interface into the SOAR platform allows efficient communication between the SOAR platform and the cybersecurity threat protection applications. As cybersecurity events occur, including threat events, maintenance events, upgrades, and so on, the logs, reports, and program data exchanges between the SOAR platform and the cybersecurity threat protection applications can be collected and added to the database used by the AI user interface. The continual addition of text data 226 to the database used by the natural language UI and the AI user interface can allow the user interface to improve the quality of interactions between users, the SOAR platform, and the threat protection applications. The training database accessed by the user interfaces can continue to expand and refine the interactions between both users and the applications.

The flow 200 can include access to the natural language UI by an application program interface (API) 224 in the SOAR platform (discussed later). An application program interface (API) can be a set of programs and rules that allow different applications to exchange information. It acts as an intermediate layer that processes data between systems, allowing application data and functionality to extend to third-party developers as well as internal departments within the same network. In embodiments, one or more APIs can be used to accept data from the one or more cybersecurity threat protection applications into the natural language AI user interface. The API can also be used to send requests for data and commands to the cybersecurity threat protection applications. The API can be used to include input from a compliance engine audit tool. A compliance engine audit tool is a set of applications that can interrogate cybersecurity applications to generate reports and gather data in order to determine how a cybersecurity application responds to various conditions in the network, as well as review the settings that are in place within the application. These settings can be compared to compliance policies in the compliance audit tool database. Interpreting the network compliance requirements can be done by inputting text from regulatory and compliance documentation, internal company policy documents, audit findings, incident reports, and so on. Input from the cybersecurity threat protection applications can use the API in the natural language AI user interface as well. The input from all of these sources into the database of the AI user interface can enable the SOAR platform to converse programmatically with the cybersecurity threat protection applications, interpret their data, respond to their input, and manage the tasks undertaken by the applications as they react to cybersecurity events.

The flow 200 can include the AI user interface being engaged by a cybersecurity representative 230. In embodiments, the cybersecurity representative 230 can submit text 226 or voice 228 input to the SOAR platform through the natural language UI 220 as part of the overall AI user interface 210. A cybersecurity representative can be an IT cybersecurity staff member, an auditor, a compliance officer, a company policy maker, a regulator, and so on. The cybersecurity representative can make comments regarding the interpretation of various internal or external regulatory or compliance requirements, observations regarding the performance of cybersecurity threat protection applications, recommendations regarding steps to be taken in response to changes in compliance rules, and so on. The voice or text input from the cybersecurity representative can be used to generate reports to management and compliance departments within the organization, add comments to audit findings, submit settings or workflow changes to cybersecurity applications, add data to the training database for the NLP user interface, and so on. In addition, input via diagrams, corrections to workflows, and other non-verbal input can be captured and used to train an artificial intelligence (AI) based SOAR system.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
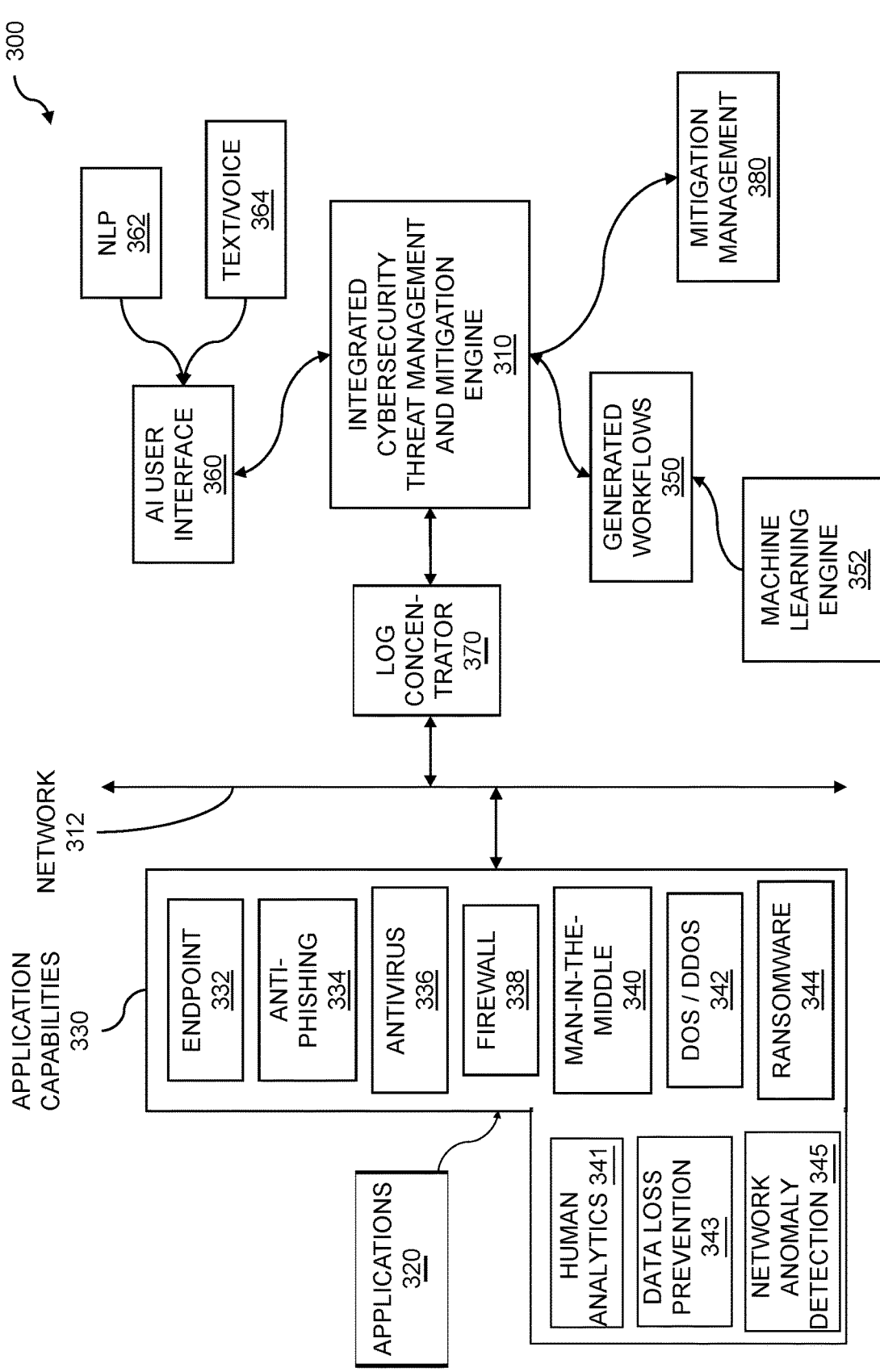
FIG. 3 is a system block diagram for cybersecurity mitigation management.

FIG. 3 is a system block diagram 300 for cybersecurity mitigation management. The SOAR platform generates and manages cybersecurity workflows based on data from cybersecurity threat protection applications, internal and external IT cybersecurity policies, regulations, compliance rules and requirements, company policies, user comments, and cybersecurity events. The input from the internal and external sources is fed into a machine-learning model through an AI user interface. The AI user interface can use an embedded natural language processor that can accommodate text and voice data. The machine learning model can analyze the compliance and regulatory requirements and generates workflows that can be executed by the cybersecurity threat protection application in response to cybersecurity events as they occur. The workflows can be designed to ensure that the cybersecurity events are mitigated in accordance with the associated compliance and regulatory standards. Threat management such as cybersecurity threat management may include detecting new cybersecurity threats and assigning those threats to one or more analysts for action. Cybersecurity management is accomplished by an integrated cybersecurity threat management and mitigation engine. The mitigation management system can be part of a SOAR platform. A plurality of network-connected cybersecurity threat protection applications is accessed. A plurality of inputs is received from the cybersecurity threat protection applications, wherein the plurality of inputs is initiated by one or more cybersecurity events. A computer platform is used to analyze metadata associated with the plurality of inputs from the cybersecurity threat protection applications. A cybersecurity threat response can be generated, the results are tracked and used to update the machine learning model database in order to assess the threat response and improve subsequent responses.

An example system block diagram 300 for threat management is shown. Threat management such as cybersecurity threat management can be critical to an organization. The cybersecurity threat management can be used to monitor operations such as data operations within the organization. When anomalies or outright threats are detected, threat management applies a variety of techniques to determine the cause of an anomaly, a source of a threat, and responses to the anomalies and threats. The block diagram 300 can include an integrated cybersecurity threat management and mitigation engine 310. The management and mitigation engine can access applications; collect and ingest log files from the applications; sort, integrate, and evaluate threat protection elements; and so on. The engine can include one or more processors, processor cores within integrated circuits or chips, CPUs, GPUs, and so on. The management and mitigation engine can be coupled to a network 312 such as a computer or cybersecurity network. The network can be based on wired and wireless communications techniques.

The block diagram 300 can include a plurality of applications 320. The applications can include network-connected cybersecurity threat protection applications. The applications can perform tasks such as network and processor monitoring; data integrity monitoring; data, services, and physical access control; etc. Some applications within the plurality of threat protection applications can perform unique tasks, similar or redundant tasks, and the like. The applications within the plurality of cybersecurity threat protection applications can include application capabilities 330. The application capabilities 330 can include endpoint protection 332. Endpoint protection can include authentication and supervision of "endpoint" devices. The endpoint devices can include desktop computers, laptop computers, tablet computers, personal electronic devices such as smartphones and PDAs, and so on. Endpoint protection can include enabling access of the endpoint devices based on one or more rights. Access rights can include creating, editing, and deleting files, folders, and so on. Access rights can include read-write, read-only, write-only (e.g., a drop box), etc. Endpoint protection can restrict access, impose security rules, and the like.

Application capabilities 330 can include anti-phishing 334 techniques. "Phishing" threats can be based on sending fraudulent email messages, where the messages appear to be from a legitimate sender who may be known to the recipient. The messages are used to gather sensitive, identifying information about an individual which is then used to defraud the individual. The application capabilities 300 can include antivirus 336 techniques. Antivirus techniques can be used to detect viruses that can be embedded in data such as images, audio files, and so on. The application capabilities 330 can include firewall 338 techniques. Firewall techniques can be used to block network traffic, applications, etc. that can attempt to penetrate a network and IT infrastructure using one or more network ports and communications protocols. The application capabilities 330 can include man-in-the-middle detection and prevention techniques 340. A "man-in-the-middle" cybersecurity threat includes interception of communications between a user or endpoint device and an entity with which the user or endpoint device is trying to communicate. The communications interception attempts to extract personal or identifying information from the communications for fraudulent purposes. The application capabilities 330 can include denial-of-service (DOS) and distributed denial-of-service (DDOS) 342 detection techniques. Denial-of-service attacks attempt to render a website, computer, processor, and so on unreachable or unusable by overwhelming it with requests. The application capabilities 330 can include ransomware 344 detection techniques. Ransomware attacks encrypt a victim's data. The encrypted data is only decrypted, if at all, after payment of a ransom. The application capabilities 330 can include human analytics 341. The human analytics 341 may include tracking/ logging anomalous user actions and identifying whether a cybersecurity representative is becoming a threat. In other words, the human analytics 341 provides for insider threat detection techniques described in reference to FIG. 7. The application capabilities 330 can include data loss prevention 343, which may include keeping track of what happens to data of an organization. The application capabilities 330 can include network anomaly detection 345, which may include various other anomaly detection techniques that may be performed to uncover anomalies in a network more generally.

The block diagram 300 can include an artificial intelligence (AI) user interface 360. In embodiments, the AI user interface includes a natural language processing (NLP) user interface 362. The AI user interface can input and output text and/or voice 364 data using human-like language based on the NLP user interface 362. The AI user interface can be used to assimilate one or more cybersecurity compliance requirements into the integrated cybersecurity threat management and mitigation engine 310 as part of the SOAR platform. In embodiments, the compliance requirements are based on one or more compliance standards, regulatory requirements, company policy documents, and company incident response documents. The compliance requirements can be based on company industry segment standards. The AI user interface can also accept input and transmit output to the cybersecurity threat protection applications 320. In some embodiments, the network can include an embedded universal data layer comprising two or more cybersecurity threat protection application mappings. The first mapping of the two or more cybersecurity threat application mappings includes a transformation of outputs of each of the plurality of cybersecurity threat applications. The second mapping of the two or more cybersecurity threat application mappings includes a transformation of inputs of each of the plurality of cybersecurity threat applications. The universal data layer (UDL) can be used to "standardize" data provided to or generated by the cybersecurity threat protection applications. The applications can use different but similar terms to describe or label a threat, an action, a result, and so on. In a usage example, a security threat event such as detection of a virus or trojan can cause one application to generate a signal such as "security threat detected", while a second application can generate a signal such as "virus detected". Since the different labels are used by the different applications to indicate a substantially similar threat event, the two labels can be standardized. For example, "security threat detected" and "virus detected" can be standardized to "integrity threat" or similar. In embodiments, the SOAR platform can manage cybersecurity for a data network, based on data collected through the first UDL mapping and data transmitted through the second UDL mapping.

The block diagram 300 can include a machine learning engine 352. The machine learning engine 352 can analyze the cybersecurity network compliance requirements that are input through the AI user interface 360 and the input data, logs, reports, and so on from the cybersecurity threat protection applications 320 to generate cybersecurity workflows 350 for the SOAR-managed network 312 based on the cybersecurity compliance requirements. In embodiments, the result is to generate a set of application policies, rules, settings, and workflows for the cybersecurity threat protection applications that direct the applications to respond to cybersecurity events in a manner that is consistent with the internal and external regulatory and compliance requirements for the network. The generating of the cybersecurity workflows is performed by the machine learning engine 352, which is embedded in the SOAR platform and trained by the data gathered by one or more instantiations of the SOAR platform.

The block diagram 300 can include one or more mitigation responses generated by the integrated cybersecurity threat management and mitigation engine 310. The generated responses can be provided to a cybersecurity mitigation management entity 380. A cybersecurity mitigation management entity can include a human-based entity, a machine-based entity, or a combination of human-based and machine-based entities. In embodiments, the cybersecurity mitigation management entity can be a cybersecurity professional. The cybersecurity professional can be an employee of an organization, a consultant to the organization, and so on. In other embodiments, the cybersecurity threat management entity can be a security orchestration, automation, and response (SOAR) application. The SOAR application (or SOAR platform) can handle threat detection, response generation, case tracking, and so on. The system block diagram can include a log concentrator 370. The log concentrator can sort a plurality of log files, can integrate the log files, and so on. The concentrator can extract key information from the log files. The concentrator can compress log file data.

In embodiments, cybersecurity threat events can generate multiple inputs from the plurality of threat protection applications 320 with multiple application capabilities 330. The inputs from the applications can be fed into a log concentrator 370 that can normalize the inputs, place them in time sequence, and forward them to the integrated cybersecurity threat management and mitigation engine 310. The threat management and mitigation engine 310 can use the application inputs to track ongoing mitigation responses based on the cybersecurity threat protection application workflows and statuses of various components and applications involved in a cybersecurity threat event, and can compare timings and other parameters of the application responses. The application inputs can also be recorded by the machine learning engine to update its database as new events and mitigation steps are employed by the mitigation management threat management and mitigation engine 310, and human cybersecurity professionals to provide mitigation management 380, which can be implemented as part of a SOAR platform.

Figure 4:
FIG. 4 illustrates artificial intelligence and machine language interfaces.
Figure 4:
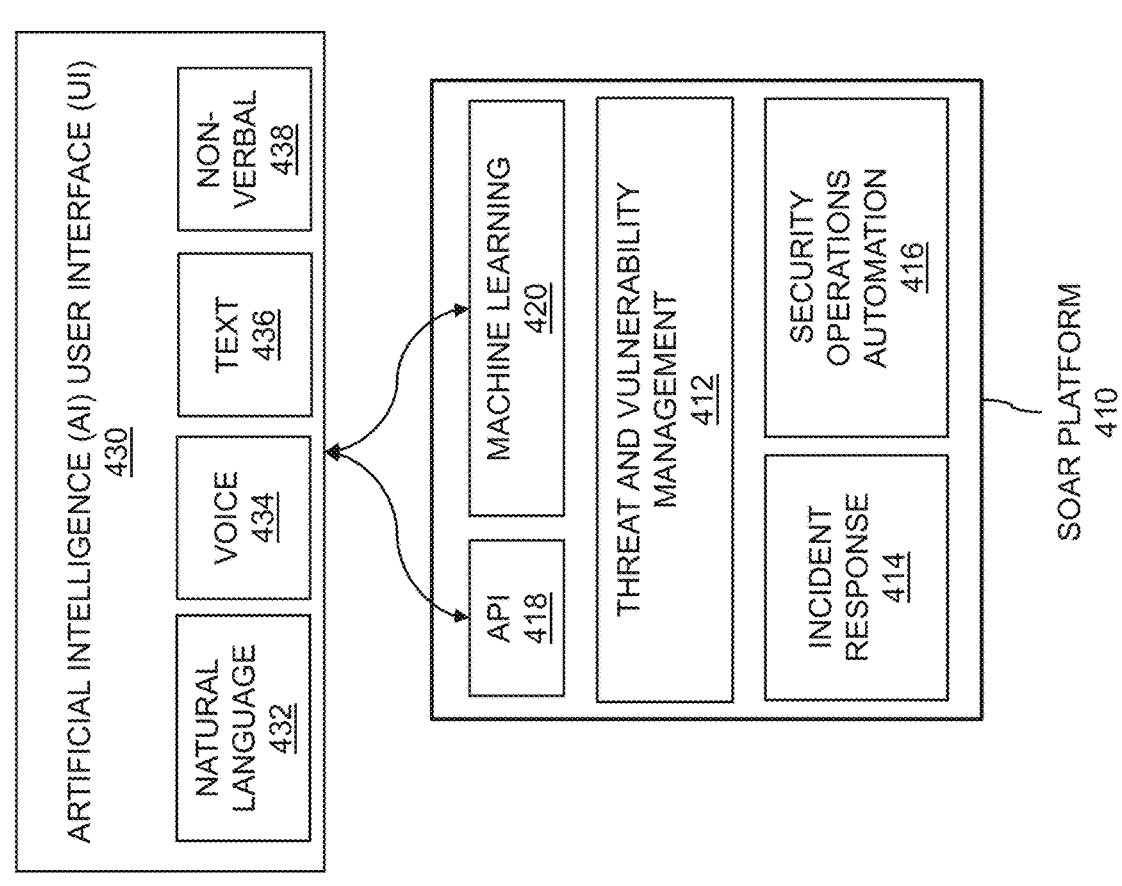

FIG. 4 illustrates artificial intelligence (AI) and machine learning interfaces. As mentioned above and throughout, a plurality of cybersecurity threat protection applications can be deployed across a managed security network. The cybersecurity threat protection applications can be managed by a SOAR platform. The SOAR platform can include a threat and vulnerability management engine. Cybersecurity network compliance requirements can be assembled from external sources, including government regulatory bodies, industry standards, and best practices recommendations from vendors and industry groups. Internal sources including audit, compliance, and legal departments; company policy documents; and company incident reports from within an organization can also contribute to the generation of compliance requirements for an organization and its cybersecurity network. The AI user interface can use natural language processing (NLP) to take in and interpret the text and verbal information from the internal and external sources and use it to populate a machine learning model. The cybersecurity threat protection applications can add data to the machine learning model using an application program interface (API). The machine learning model can analyze the contents of the various sources, combine the regulations and compliance standards, and generate software application policies and workflows for the cybersecurity threat protection applications to use in responding to cybersecurity events. As cybersecurity events occur, the threat and vulnerability management engine can use incident response and security operations automation systems to mitigate the cybersecurity threat, compare the steps taken to the network compliance requirements, and generate remedies as needed to address any gaps between the cybersecurity incidence responses and the compliance requirements. The necessary changes can be made through the security operations automation system, and the machine learning model database can be updated accordingly.

The illustration 400 can include a security orchestration, automation, and response (SOAR) platform 410. The SOAR platform 410 can access and manage one or more cybersecurity threat protection applications that are deployed across a managed cybersecurity network. The SOAR platform can enable data collection from a wide range of data sources such as threat data sources. The threat data sources can include data uploaded by cybersecurity experts, data produced by cybersecurity threat protection applications, and so on. The SOAR platform can be used to manage threat protection processes, anti-threat technologies, and human expertise. The SOAR platform can centralize management of IT assets such as networks, processors, data storage elements, etc. on a network-connected computer platform. The SOAR platform can provide threat alerts and can also provide contexts for the alerts. The SOAR platform can further automate responses to threats, adapt the responses using machine learning, and so on. The SOAR platform can use a library of cybersecurity mitigation success metrics to compare timing and effectiveness of mitigation steps to previous events and successful mitigation processes.

The illustration 400 can include an artificial intelligence (AI) user interface 430. The AI user interface comprises a natural language processing AI user interface 432. In embodiments, the natural language AI user interface 432 is accessed by an application program interface (API) 418 in the SOAR platform 410. An application program interface (API) is a set of programs and rules that allow different applications to exchange information. It acts as an intermediate layer that processes data between systems, allowing application data and functionality to extend to third-party developers as well as internal departments within the same network. In embodiments, one or more API programs can be used to accept data from the one or more cybersecurity threat protection applications into the AI user interface 430. The API can also be used to send requests for data and commands to the cybersecurity threat protection applications. The natural language AI user interface 432 can be accessed using text 436 and/or voice 434. The natural language AI user interface 432 can be engaged by a cybersecurity representative. Input from the cybersecurity threat protection applications can use the API into the natural language AI user interface as well. The input to AI user interface 430 can include non-verbal prompts 438 such as diagrams, or it can be in the form of changes made to cybersecurity workflows by a human agent. The input from all of these sources into the database of the AI user interface can enable the SOAR platform to converse programmatically with the cybersecurity threat protection applications, interpret their data, respond to their input, and manage the tasks undertaken by the applications as they react to cybersecurity events.

The illustration 400 can include a machine learning model 420. The machine learning model (ML) 420 can be embedded in the SOAR platform 410, wherein the ML is trained by data gathered by one or more instantiations of the SOAR platform. The ML can be accessed through an application program interface (API) 418 in the SOAR platform. A machine learning (ML) model can be built using compliance and regulatory data from the natural language AI user interface 432 and data from the cybersecurity threat protection applications input through one or more APIs. The translating of the compliance and regulatory rules and requirements into cybersecurity threat protection policies, rules, and settings by the ML model can be augmented by input from a cybersecurity representative, from publicly available cybersecurity threat applications, and from company policy documentation. As cybersecurity events occur, either within the managed cybersecurity network or on other similar networks across the globe, incident reports in various forms are published by threat protection application vendors, regulatory agencies, auditors, watchdog agencies, internal audit and compliance departments, IT departments, and so on. All of this input can be used to update and refine the translation of network compliance requirements into policies, rules, and application settings. The input can be introduced into the machine learning model using one or more APIs 418 and/or through the AI user interface 430.

In embodiments, the machine learning model 420 can generate a set of application policies, workflows, rules, and settings, for each of the cybersecurity threat protection applications, that direct the applications to respond to cybersecurity events in a manner that is consistent with the internal and external regulatory and compliance requirements for the network. The generating of the cybersecurity workflows is performed by the ML model, which is embedded in the SOAR platform and trained by the data gathered by one or more instantiations of the SOAR platform. The cybersecurity workflows can include managing one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and end-to-end incident lifecycle case management. The cybersecurity application policies can include information on how to respond to specific types of threats, how often to report operational status, how often and when to install updates, whom to notify during priority events, how to notify, and so on. The cybersecurity application policies can include details on which processes are to be handled by the SOAR platform, so that only condition and status data is sent forward to the SOAR platform, and which processes are to be handled by the application directly, with status data to follow. The application policies can include settings on how the application is to proceed in the event that the SOAR platform is unavailable, and so on.

The illustration 400 can include one or more components associated with cybersecurity threat management. The SOAR platform can include a threat and vulnerability management component 412. The threat and vulnerability management component can configure and control IT infrastructure elements such as routers, switches, processors, storage area networks (SANs), and so on. The SOAR platform can include an incident response component 414. The incident response component can provide alerts, can trigger one or more actionable responses, and the like. As an illustrative example, the incident response component 414 can include generating and reporting cybersecurity trends, including but not limited to incidents tracked, incidents resolved, etc. The reporting can be performed/generated at predetermined time intervals, such as daily, weekly, biweekly, monthly, yearly, etc. As another example, the incident response component 414 can include generating reports of each incident that was detected and/or resolved. In embodiments, the actionable response can enable scalability of a connected SOAR platform. The SOAR platform can be scaled up to address many threats, to reduce threat response time, etc. In embodiments, the actionable response can include a recommendation for a cybersecurity professional. The recommendation can include a recommendation for a threat response policy, a source for further information about the threat, etc. In further embodiments, the actionable response can include an autonomic network reconfiguration. An autonomic network reconfiguration can include isolating IT elements, restricting IT elements, and the like. In embodiments, the actionable response can include an autonomic cybersecurity threat protection application reconfiguration. The threat protection application reconfiguration can include isolating, reinstalling, reconfiguring, or rebooting an application. The threat protection application reconfiguration can include synchronizing operation of two or more threat protection applications.

The illustration 400 can include security operations automation 416. Security operations management can include automatically securing IT infrastructure elements such as switches, routers, processors, storage elements, etc., where the securing can be based on a procedure, a policy, and so on. The security operations automation can include updating IT element software and firmware, installing and configuring security software such as antivirus software, and the like. Cybersecurity threat application inputs can include alerts, text or SMS messages, email, a rendering on a graphical display, and so on. The analysis can be based on metadata associated with the plurality of inputs from the cybersecurity threat protection applications. The metadata can include a variety of status and other information such as a time and a frequency of cybersecurity threat protection application inputs, one or more techniques used to receive the application inputs, who or what tool provided the application inputs, etc. The mitigation response can include a workflow that can be developed to address, rectify, remediate, prevent, etc. the cybersecurity threat. The cybersecurity threat response can address various types of events such as a zero-day event.

In embodiments, executing cybersecurity workflows can include tagging a cybersecurity incident as part of the incident response 414 process, when a mismatch between the incident response and the associated compliance requirement occurs. As cybersecurity events occur, the cybersecurity threat protection applications log events and report statuses and actions taken to the SOAR platform. The SOAR platform responds with additional requests, commands, communications, and so on as the event progresses. Reporting to incident lifecycle applications, updating security personnel, receiving updates from vendors, modifying application behaviors, and so on can all be a part of the cybersecurity incident. As the incident progresses, mismatches with established compliance standards and internal policies specific to an enterprise or agency may be revealed, resulting in one or more tags being applied to the recording of the incident in the SOAR platform database. Defects in the application policies, processes, applications, or staff responses can be tagged and reported to cybersecurity team members, audit, and compliance officers using threat and vulnerability management 412 so that proper follow-up steps are taken, and the cybersecurity threat protection responses are brought into compliance. In some embodiments, the follow-up steps can be accomplished using security operations automation 416 as part of the SOAR platform. The event history logs, communications, and reporting can also be added to the ML model database 420 in order to improve the responses and application policies in subsequent events.

Figure 5:
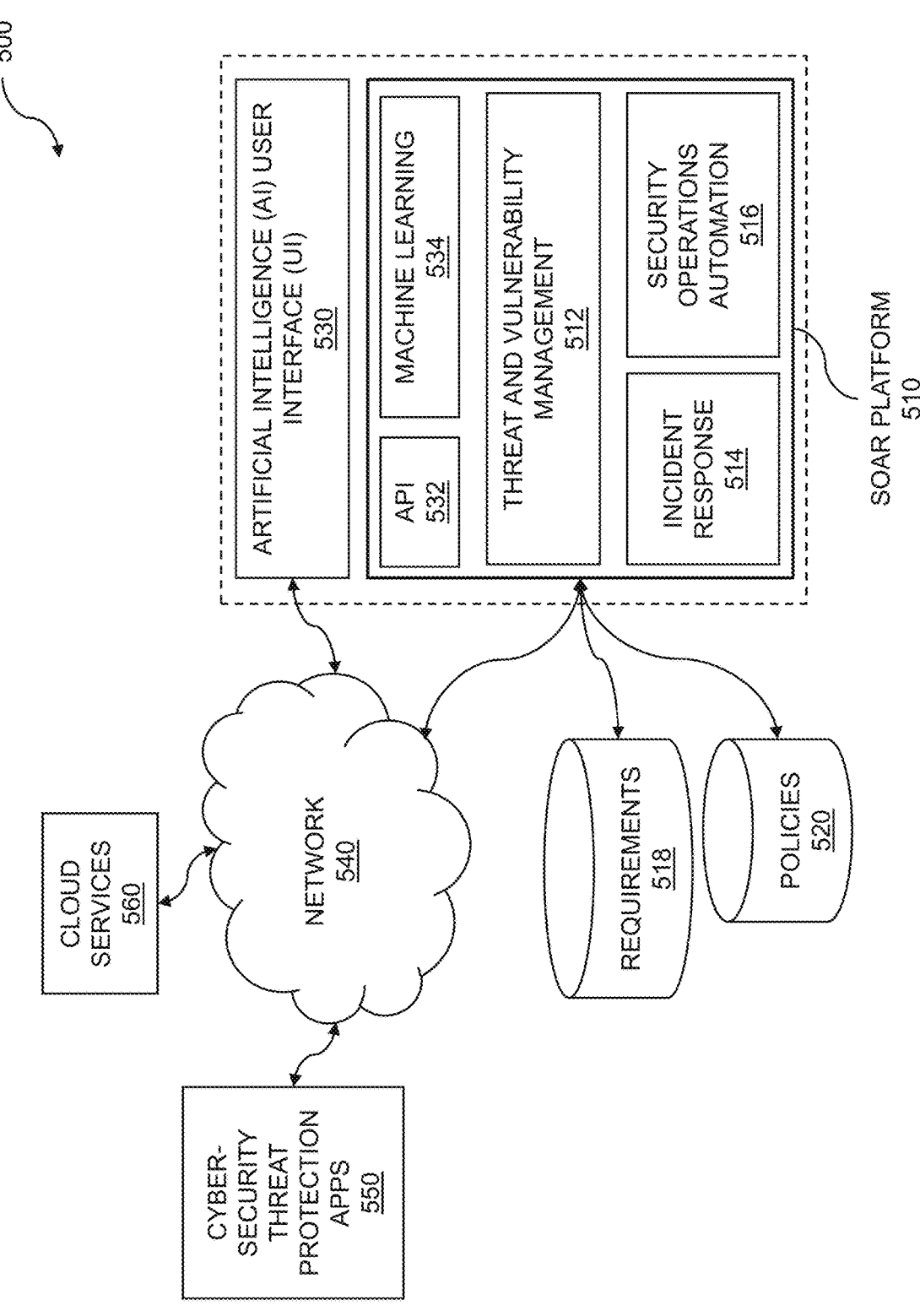
FIG. 5 illustrates a network-connected security orchestration, automation, and response (SOAR) system.

FIG. 5 illustrates a network-connected security orchestration, automation, and response (SOAR) system 500. Discussed above and throughout, cybersecurity threats can occur as often as every few seconds. These threats target individual users, businesses, universities, hospitals, government agencies, and so on. The cybersecurity threats constitute extreme menaces, and indeed existential crises, to the enterprises. Cybersecurity threat management includes identifying that a threat is underway, what IT infrastructure and data are under attack, the type of threat, etc. The cybersecurity threat management ideally then proceeds to block and remove the threat, isolate affected infrastructure, perform eradication or remediation, and the like. Cybersecurity management is enabled by cybersecurity mitigation and completion confirmation management along with threat and vulnerability management. A plurality of network-connected cybersecurity threat protection applications is accessed. A plurality of inputs is received from the cybersecurity threat protection applications, wherein the plurality of inputs is initiated by one or more cybersecurity events. A network-connected computer platform is used to analyze the plurality of inputs and the metadata associated with the plurality of inputs from the cybersecurity threat protection applications. The inputs are analyzed by the threat and vulnerability management element. A cybersecurity threat mitigation plan is generated based on the analysis. A mitigation management system oversees deployment of the mitigation steps, tracks progress, and compares mitigation results and timing to a library of mitigation success metrics. The mitigation and completion management system updates the library of success metrics and reports on the threat mitigation responses to cybersecurity management.

A network-connected security orchestration, automation, and response (SOAR) system is illustrated 500. The heart of a SOAR system can comprise a SOAR application or platform 510, where the SOAR platform can be based on one or more cybersecurity threat protection applications, tools, techniques, and so on. The SOAR platform can enable data collection from a wide range of data sources such as threat data sources. The threat data sources can include data uploaded by cybersecurity experts, data produced by cybersecurity threat protection applications, and so on. The SOAR platform can be used to manage threat protection processes, anti-threat technologies, and human expertise. The SOAR platform can centralize management of IT assets such as networks, processors, data storage elements, etc. on a network-connected computer platform. The SOAR platform can provide threat alerts and can also provide contexts for the alerts. The SOAR platform can further automate responses to threats, adapt the responses using machine learning, and so on. The SOAR platform can use a library of cybersecurity mitigation success metrics to compare timing and effectiveness of mitigation steps to previous events and successful mitigation processes.

The illustration 500 can include one or more components associated with cybersecurity threat management. The SOAR platform can include a threat and vulnerability management component 512. The threat and vulnerability management component can configure and control IT infrastructure elements such as routers, switches, processors, storage area networks (SANs), and so on. The SOAR platform can include an incident response component 514. The incident response component 514 can provide alerts, can trigger one or more actionable responses, and the like. The incident response component 514 can provide for auditing and/or reporting on cybersecurity incidents. For example, the incident response component 514 can provide period auditing for compliance with one or more different policies, frameworks, standards, and/or requirements (e.g., insurance requirements compliance). As another example, the incident response component 514 can provide reporting of identified breaches and/or cybersecurity incidents (e.g., for purposes of compliance and/or auditing), as described further in reference to the incident response component 414 of FIG. 4. In embodiments, the actionable response can enable scalability of a connected SOAR system. The SOAR system can be scaled up to address many threats, to reduce threat response time, etc. In embodiments, the actionable response can include a recommendation for a cybersecurity professional. The recommendation can include a recommendation for a threat response policy, a source for further information about the threat, etc. In further embodiments, the actionable response can include an autonomic network reconfiguration. An autonomic network reconfiguration can include isolating IT elements, restricting IT elements, and the like. In embodiments, the actionable response can include an autonomic cybersecurity threat protection application reconfiguration. The threat protection application reconfiguration can include isolating, reinstalling, reconfiguring, or rebooting an application. The threat protection application reconfiguration can include synchronizing operation of two or more threat protection applications.

The illustration 500 can include security operations automation 516. Security operations management can include automatically securing IT infrastructure elements such as switches, routers, processors, storage elements, etc., where the securing can be based on a procedure, a policy, and so on. The security operations automation can include updating IT element software and firmware, installing and configuring security software such as antivirus software, and the like. Cybersecurity threat application inputs can include alerts, text or SMS messages, email, a rendering on a graphical display, and so on. The analysis can be based on metadata associated with the plurality of inputs from the cybersecurity threat protection applications. The metadata can include a variety of status and other information such as a time and a frequency of cybersecurity threat protection application inputs, one or more techniques used to receive the application inputs, who or what tool provided the application inputs, etc. The mitigation response can include a workflow that can be developed to address, rectify, remediate, prevent, etc. the cybersecurity threat. The cybersecurity threat response can address various types of events such as a zero-day event.

The illustration 500 can include an artificial intelligence (AI) user interface (UI) 530. The AI user interface comprises a natural language processing (NLP) AI user interface. NLP uses rule-based and statistical models, as well as machine learning and deep learning techniques, to process and analyze large amounts of natural language data. In embodiments, the natural language AI user interface is embedded in the SOAR platform, wherein the natural language AI user interface is accessed by an application program interface (API) 532 in the SOAR platform. An application program interface (API) 532 is a set of programs and rules that allow different applications to exchange information. It acts as an intermediate layer that processes data between systems, allowing application data and functionality to extend to third-party developers as well as to internal departments within the same network. In embodiments, one or more APIs can be used to accept data from the one or more cybersecurity threat protection applications into the natural language AI user interface. The API can also be used to send requests for data and commands to the cybersecurity threat protection applications. The natural language AI user interface can be accessed using text and/or voice. The natural language AI user interface can be engaged by a cybersecurity representative.

The illustration 500 can include one or more cybersecurity network compliance requirements 518. In embodiments, the compliance requirements 518 are based on one or more compliance standards, regulatory requirements, company policy documents, and company incident response documents. The compliance requirements can be based on company industry segment standards. Governments, businesses, industries, and regulatory bodies work to set and maintain cybersecurity standards for their members. Regulatory bodies routinely publish and update policies and standards as cybersecurity threats increase and evolve. Small businesses and private individuals can subscribe to cybersecurity services and purchase hardware and software that can help to mitigate the threats to their data, applications, and hardware, as well as their finances. Interpreting the network compliance requirements can be done by inputting text from regulatory and compliance documentation, internal company policy documents, audit findings, incident reports, and so on. The input can be done verbally or in written word through the AI user interface 530. Input from the cybersecurity threat protection applications can use the API 532 into the natural language AI user interface as well. The input from all of these sources into the database of the AI user interface can enable the SOAR platform to converse programmatically with the cybersecurity threat protection applications, interpret their data, respond to their input, and manage the tasks undertaken by the applications as they react to cybersecurity events. In embodiments, translating the network compliance requirements 518 into workflow policies 520 and processes that the threat protection applications can implement is performed using machine learning (ML) 534. The ML is embedded in the SOAR platform 510, wherein the ML is trained by data gathered by one or more instantiations of the SOAR platform. The ML can be accessed through an application program interface (API) in the SOAR platform. A machine learning (ML) model can be built using compliance and regulatory data from the natural language AI user interface and data from the cybersecurity threat protection applications input through one or more API.

The SOAR platform 510 can use a network 540 to access a plurality of cybersecurity threat protection applications 550. The network can include a wired network, a wireless network, a hybrid wireless/wireless network, and so on. The network can be based on wired networking standards such as Ethernet™ (IEEE 802.3), wireless networking standards such as Wi-Fi™ (IEEE 802.11), and so on. The cybersecurity threat protection applications can provide capabilities such as endpoint protection, anti-phishing, antivirus, firewalls, and so on. The cybersecurity threat protection applications can further detect and protect against man-in-the middle ruses, denial-of-service (DOS) and distributed denial-of-service (DDOS) attacks, ransomware, and the like. In embodiments, the background synchronization service can communicate to the plurality of network-connected cybersecurity threat protection applications using cloud services 560. The cloud services can provide access and can also provide IT services such as software as a service (SaaS), platform as a service (PaaS), infrastructure as a service (IaaS), and so on.

Figure 6A:
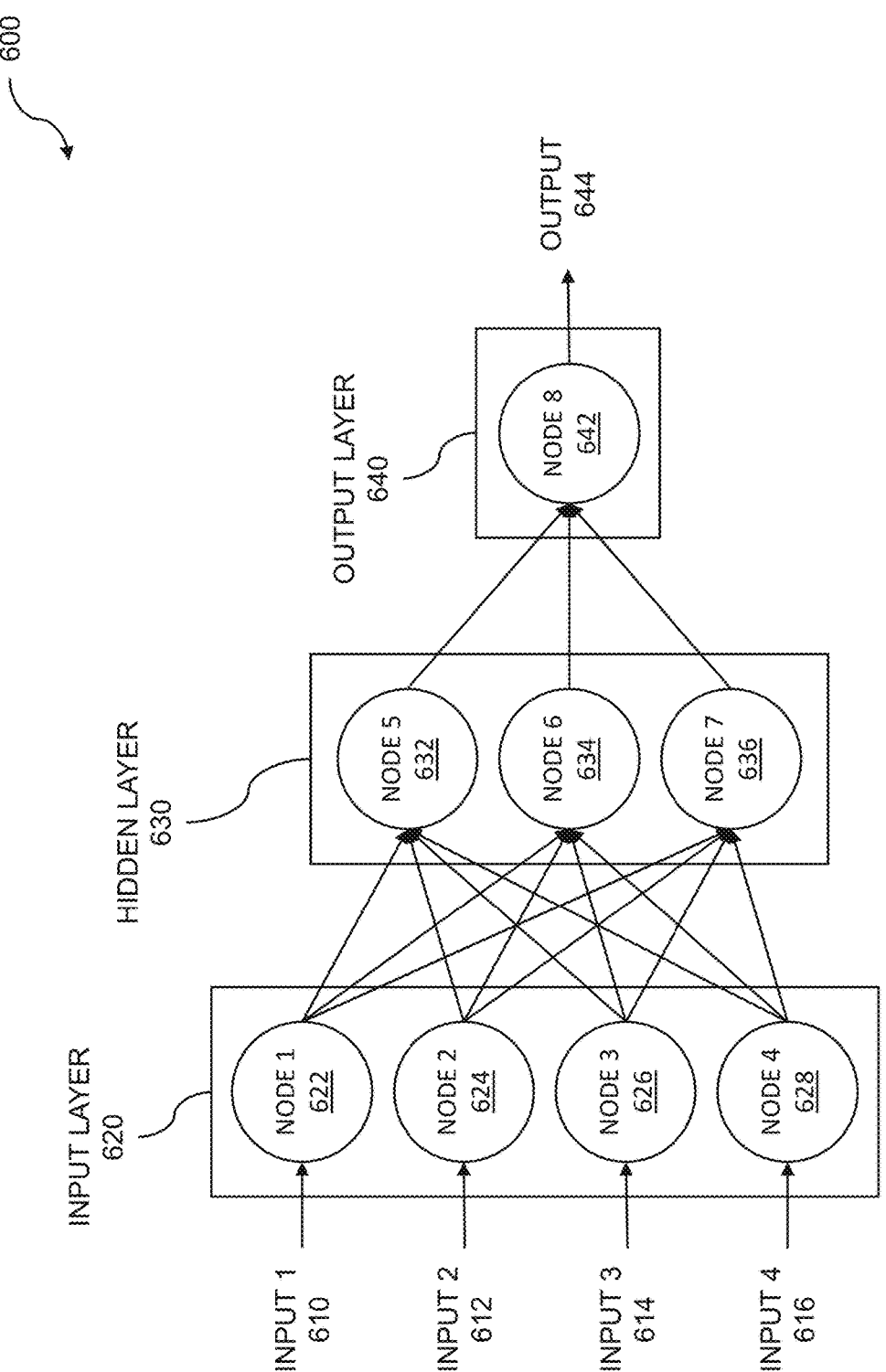
FIG. 6A shows an example neural network for machine learning.

FIG. 6A shows an example 600 neural network for machine learning. The neural network for machine learning can be based on a variety of neural network types such as a convolutional neural network (CNN), a deep neural network (DNN), a recurrent neural network (RNN), and so on. The neural network for machine learning comprises a plurality of layers, where the layers can include one or more of an input layer, an output layer, a convolutional layer, a bottleneck layer, an activation layer, and the like. The bottleneck layer, if present within the neural network, can be used for neural network training. The trained neural network can be applied to cybersecurity operations tasks such as cybersecurity operations case triage groupings. A neural network for machine learning can apply classifiers. The classifiers can be learned based on one or more inputs from a plurality of network-connected cybersecurity threat protection applications. A plurality of network-connected cybersecurity threat protection applications is accessed. A plurality of inputs is received from the cybersecurity threat protection applications, wherein the plurality of inputs is initiated by one or more cybersecurity events. A computer platform is used to analyze metadata associated with the plurality of inputs from the cybersecurity threat protection applications. The inputs are triaged into groupings, based on the metadata. A cybersecurity threat response is generated, based on the groupings.

The example 600 shows a neural network for machine learning. The neural network includes one or more layers such as input layers, hidden layers, and output layers. Layers, such as convolutional layers, activation layers, bottleneck layers, etc. that perform operations associated with applications such as machine learning can also be included within the example neural network. Data can be provided to the neural network though inputs such as input 1 610, input 2 612, input 3 614, and input 4 616. While four inputs are shown, other numbers of inputs can also be applied to the neural network. The data can include training data, production data, etc. The data is provided to an input layer 620 of the neural network. The input layer comprises one or more nodes such as node 1 622, node 2 624, node 3 626, and node 4 628. While four nodes are shown within the input layer, other numbers of nodes can be included. One or more weights (explained below) can also be provided to each node within the input layer. The outputs of the nodes associated with the input layer can be coupled to inputs of nodes associated with a hidden layer such as hidden layer 630. The hidden layer can comprise one or more nodes such as node 5 632, node 6 634, and node 7 636. While three nodes are shown, other numbers of nodes can be included in the hidden layer. In the example neural network, each output of the nodes associated with the input layer is coupled to each input of the nodes associated with the hidden layer. The coupling of each node output to each node input accomplishes a fully connected (FC) layer within the neural network.

The example neural network can include one or more hidden layers. The hidden layers can include substantially similar or substantially dissimilar numbers of nodes. The hidden layers can be fully connected layers as just described, convolutional layers where a subset of outputs is connected to a subset of inputs, bottleneck layers, activation layers, etc. The example neural network includes an output layer 640. The output layer can include one or more nodes such as node 8 642. While one node is shown within the output layer, the output layer can include more than one node. The output layer produces an output 644. The output can include a value, a probability, and so on.

Figure 6B:
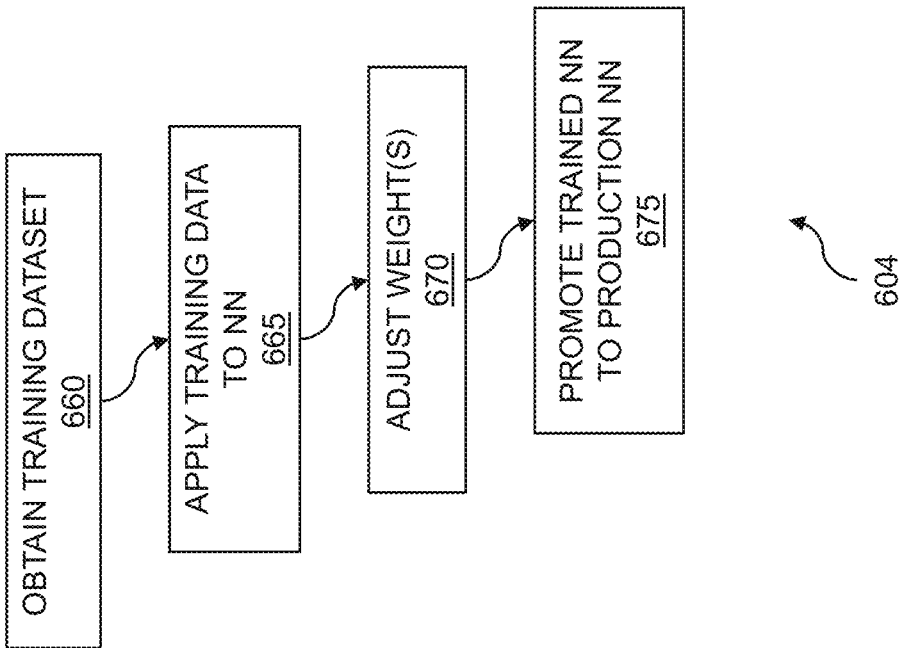
FIG. 6B shows an example of training a neural network for machine learning.
Figure 6B:
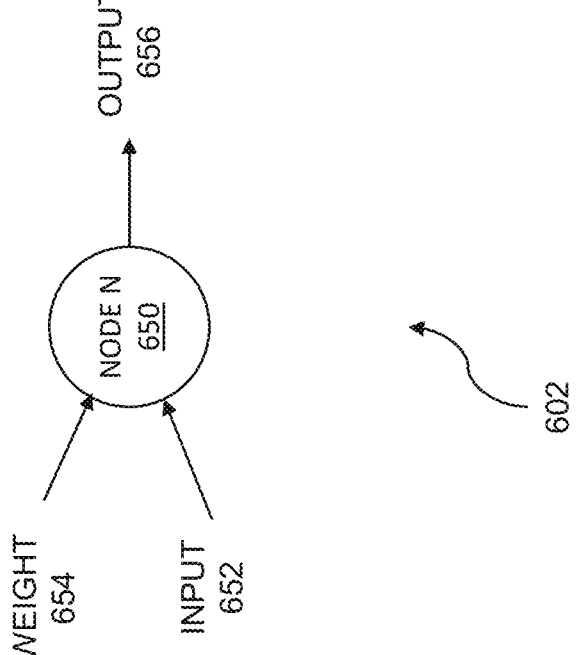

FIG. 6B shows an example 602 of training a neural network for machine learning. Discussed previously, a neural network comprises layers of nodes or neurons such as artificial neurons 622, 632, and 642, among others. The artificial neuron can be configured to process input data in order to produce output data. An example node 650 is shown. A neuron can be coupled to one or more signals or inputs such as input 652, and one or more weights such as weight 654. The node multiplies each input by its corresponding weight and maintains a running sum of the resulting products. The output of the node, such as output 656, can be calculated by applying a function such as a transfer function to the sum of products of the inputs and weights. The transfer function can include various types of functions such as a unit step or threshold function, a sigmoid, a Gaussian function, a piece-wise linear function, and so on.

Each neuron within a neural network can be trained. The training can be based on using a dataset that includes known data. The training can be further based on comparing results of data processing by the neural network with expected results associated with the known data. The expected results include results of neural network processing of the dataset of known data. One or more weights associated with each node are adjusted until the neural network can form an inference that produces the expected result. In a usage example, a dataset of images of dogs or cats can be used to train a neural network to identify dogs or cats within images not included in the training data set. A flow for neural network training is shown. The neural network training can include training a neural network for machine learning applications. The flow 604 includes obtaining 660 a training dataset. The training dataset can include cybersecurity operations center caseload histories, resolutions to cybersecurity threats, and so on. The training dataset can include threat response resolution metrics. The training dataset can further include one or more objective ratings, where the objective ratings can be used to update the threat response resolution metrics. Further, a subjective rating can include a management-supplied rating, a peer-supplied rating, a machine-learning-supplied rating, etc.

The flow 604 includes applying 665 the training data to a neural network. The training data is provided to the inputs of the neural network and the neural network proceeds to process the test data. The flow 604 includes adjusting one or more weights 670 associated with the nodes of the neural network. The adjusting the weights can enable enhanced convergence by the neural network to an expected result.

The enhanced convergence can reduce neural network processing time, improve inference accuracy, etc. The adjusting the weights can include an iterative process. The adjusting weights associated with the nodes within the neural network can become more accurate as further training data is provided. The flow 604 includes promoting the trained neural network 675 to a production neural network. The production neural network can be used to process data such as a security operations center (SOC) caseload history. The production neural network can continue to adapt or learn based on processing further data. The learning can include further adjustment to one or more weights associated with nodes within the neural network. In embodiments, the accessing, the analyzing, the augmenting, the receiving, and the assigning, all of which are discussed previously, can be converted to machine learning training data. The machine learning training data that was converted can be used to further train or adjust the machine learning neural network.

Figure 7:
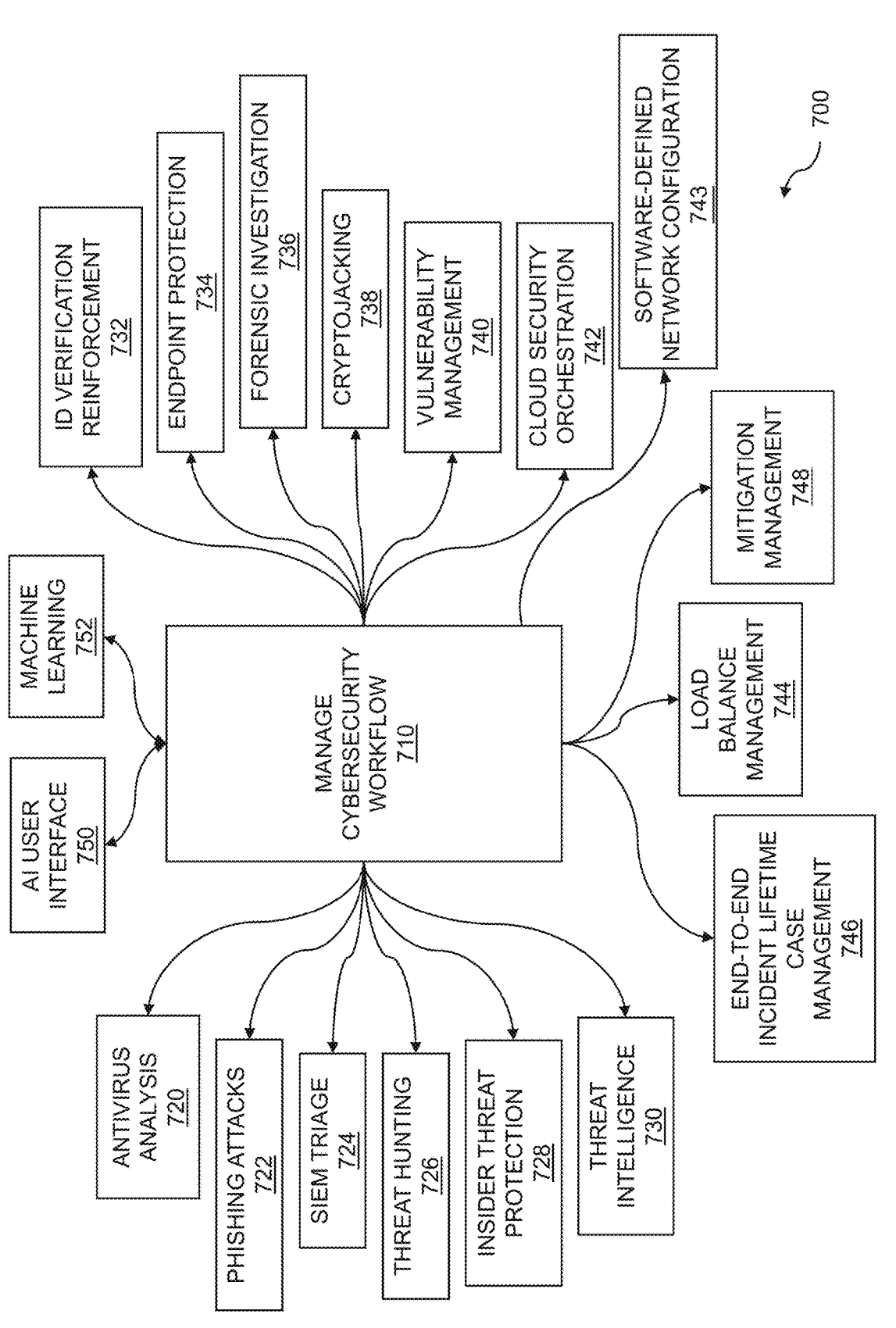
FIG. 7 is an infographic for cybersecurity workflow management.

FIG. 7 is an infographic for cybersecurity workflow management. Information technology (IT) infrastructure comprises computing devices, storage devices, networks, perhaps personal devices, operating systems, cloud-based systems, and so on. Whether these IT elements are operated by an individual for personal use or by an organization in support of operations, all of the IT elements are nearly constant targets of malicious attacks from outside an organization. Worse yet, some of the attacks originate from within an organization. A plurality of network-connected cybersecurity threat protection applications is accessed. A plurality of cybersecurity network compliance requirements is accessed. The cybersecurity network compliance requirements are translated into cybersecurity threat protection application policies and workflows used to direct the cybersecurity threat protection applications as they respond to cybersecurity events. A plurality of inputs is received from the cybersecurity threat protection applications, wherein the plurality of inputs is initiated by one or more cybersecurity events. A computer platform is used to analyze the plurality of inputs from the cybersecurity threat protection applications. The inputs are analyzed by a threat and mitigation management system. A cybersecurity threat mitigation response is generated, deployed, tracked, and compared to cybersecurity network compliance requirements. The completion of mitigation events is stored and reported on to cybersecurity administrators and managers.

The infographic 700 can include cybersecurity management 710. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The infographic 700 can include an artificial intelligence (AI) user interface 750. In embodiments, the AI user interface comprises a natural language AI user interface. The natural language AI user interface employs natural language processing (NLP) algorithms. The natural language processing (NLP) algorithms can give computers the ability to understand, generate, manipulate, and respond to text and speech data in natural human-like language. NLP uses rule-based and statistical models, as well as machine learning and deep learning techniques, to process and analyze large amounts of natural language data. The AI user interface comprises a natural language AI user interface that can input and output both text and verbal data.

The AI user interface 750 can be used to assimilate cybersecurity network compliance requirements into the SOAR platform. The compliance requirements are based on one or more compliance standards, regulatory requirements, company policy documents, and company incident response documents. The infographic 700 includes translating the cybersecurity network compliance requirements into one or more cybersecurity application policies. The cybersecurity application policies provide cybersecurity network conformity with the compliance requirements. Input from the various compliance, regulatory, and company policy statements regarding cybersecurity standards and responses into a natural language AI user interface allows the SOAR platform to interpret the requirements for the threat protection applications installed on the managed cybersecurity network. Input from the cybersecurity threat protection applications allows the SOAR platform to interact with the applications. In embodiments, translating the network compliance requirements into policies and workflows that the threat protection applications can implement is performed using machine learning (ML) 752. The ML 752 is embedded in the SOAR platform, wherein the ML is trained by data gathered by one or more instantiations of the SOAR platform. The ML can be accessed through an application program interface (API) in the SOAR platform. A machine learning (ML) model can be built using compliance and regulatory data from the natural language AI user interface and data from the cybersecurity threat protection applications input through one or more APIs. In embodiments, the result is to generate a set of application policies and workflows for each of the cybersecurity threat protection applications that direct the applications to respond to cybersecurity events in a manner that is consistent with the internal and external regulatory and compliance requirements for the network. The cybersecurity application policies and workflows can include information on how to respond to specific types of threats, how often to report operational status, how often and when to install updates, whom to notify during priority events, how to notify, and so on. The cybersecurity application policies and workflows can include details on which processes are to be handled by the SOAR platform, so that only condition and status data is sent forward to the SOAR platform, and which processes are to be handled by the threat protection applications directly, with status data to follow. The policies and workflows can include settings on how a threat protection application is to proceed in the event the SOAR platform is unavailable, and so on.

The infographic 700 can include antivirus analysis 720. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The infographic 700 can include analysis of phishing attacks 722. Phishing is a form of attack that attempts to fraudulently obtain personal, sensitive, or private data and information. The data or information that is sought by a phishing attack can include personal information such as name, address, date of birth, telephone number, email address, and so on. The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The infographic 700 can include security information and event management (SIEM) triage 724. SIEM, which combines the management of security information and security events, can provide analysis of security alerts, alarms, warnings, etc. in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The infographic 700 includes threat hunting 726. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The infographic 700 includes insider threat protection 728 (e.g., human analytics). Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization-a lateral transfer.

The infographic 700 can include threat intelligence 730. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The infographic 700 includes identity verification reinforcement 732. Identity verification can include techniques to verify that a person who has access to computing systems, data systems, networks, and so on that are associated with an enterprise, is in fact a real person. Identity verification can be based on physical documents such as a government issued identification documents. The infographic 700 can include endpoint protection 734. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device, including personal electronic devices, meets certain standards prior to connection to the enterprise network. The standards can include approved devices, operating systems, applications, antivirus applications, virtual private network apps, etc.

The infographic 700 can include forensic investigation 736. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The infographic 700 includes the detection of cryptojacking 738. Cryptojacking can include hijacking of computers, servers, personal electronic devices, and so on for the purposes of mining cryptocurrency. The infographic 700 includes vulnerability management 740. Vulnerability management seeks to reduce risks to computing systems, data systems, networks, and so on by identifying, evaluating, correcting, and communicating vulnerabilities associated with the computing systems and the applications that are executed on the computing systems. The infographic 700 includes cloud security orchestration 742. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement. The infographic 700 includes software-defined network configuration 743, which may include software architectural policies implemented in a network, organization, and/or across one or more computing systems.

The infographic 700 can include load balance management 744. The load balance management can balance and adjust assignment of cybersecurity threats to one or more analysts. The load balance management attempts to assign a cybersecurity threat to a specific analyst who is best suited to handling and addressing the cybersecurity threat. If the caseload associated with the analyst is "heavy" or "full", then one or more cases assigned to that analyst can be reassigned to one or more other analysts. In embodiments, the reassigning can include a re-triage of an existing SOC caseload. The re-triage results can be used to reassign one or more analysts determined to be capable of handling the cybersecurity threat. The infographic 700 includes end-to-end incident lifetime case management 746. An incident can include a virus outbreak, a distributed denial-of-service (DDOS) attack, and the like. Incident lifetime management can include identifying that an incident has occurred, notifying that the incident has occurred and escalating response to the incident, investigating and diagnosing the incident, resolving the incident, and recovering from the incident. Incident lifetime management can further include closing the incident. The infographic 700 includes mitigation management 748. The mitigation management can coordinate actions taken by cybersecurity threat protection applications and security analysts as they are implemented. The timing and effectiveness of the mitigation steps can be tracked and compared to a library of cybersecurity mitigation success metrics. The results can be reported to cybersecurity managers and machine learning models to improve responses and identify possible weak points in network security.

Figure 8:
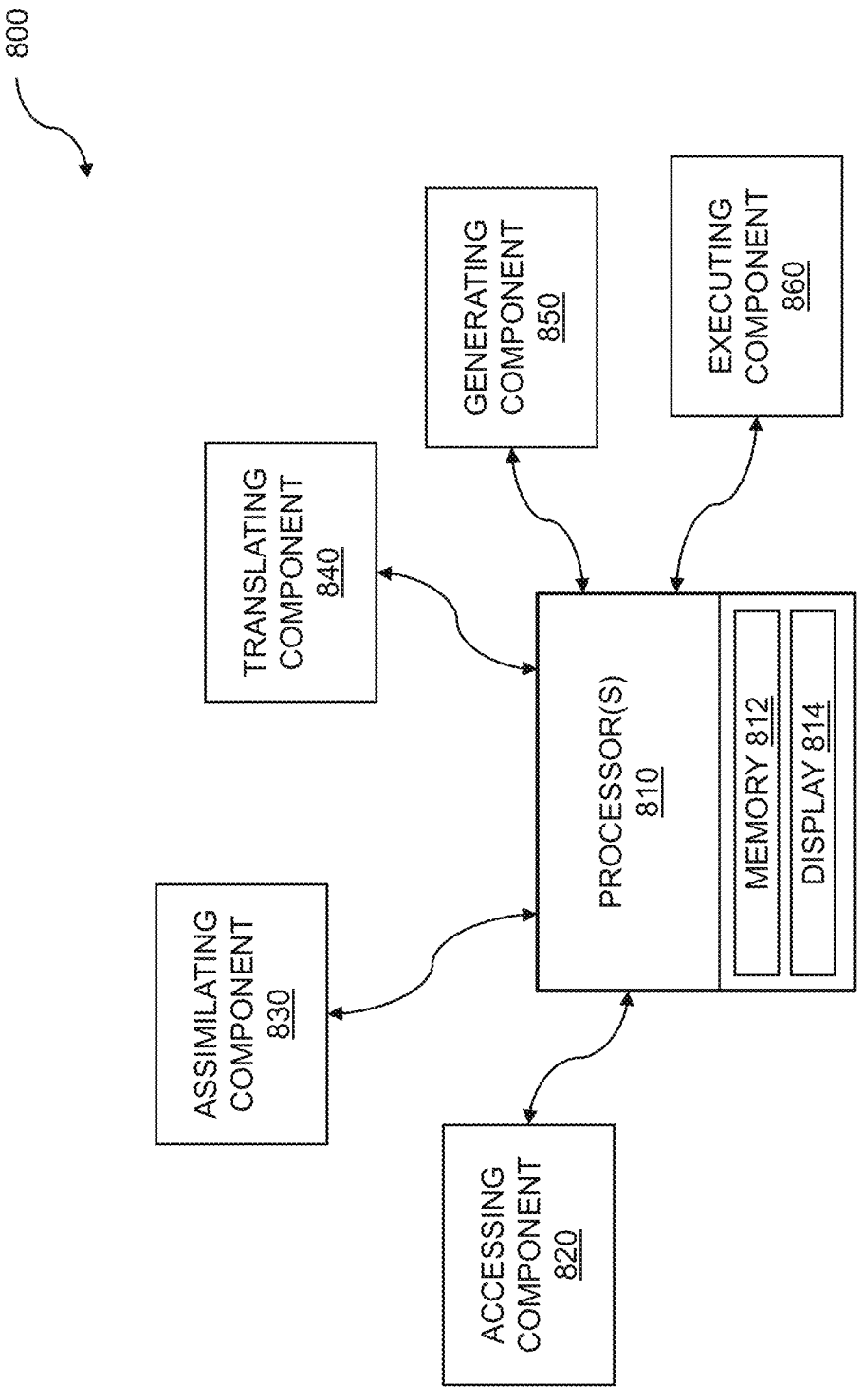
FIG. 8 is a system diagram for cybersecurity AI-driven workflow generation using policies.

FIG. 8 is a system diagram 800 for cybersecurity AI-driven workflow generation using policies. The system 800 can include one or more processors 810 attached to a memory 812 which stores instructions. The system 800 can include a display 814 coupled to the one or more processors 810 for displaying data, video streams, videos, intermediate steps, instructions, and so on. In embodiments, one or more processors 810 are attached to the memory 812 where the one or more processors, when executing the instructions which are stored, are configured to: access a plurality of cybersecurity threat protection applications, wherein the plurality of cybersecurity threat protection applications are deployed across a managed cybersecurity network, and wherein the cybersecurity threat protection applications are managed using a security orchestration, automation, and response (SOAR) platform; assimilate one or more cybersecurity network compliance requirements into the SOAR platform; translate the one or more cybersecurity network compliance requirements into one or more cybersecurity policies, wherein the one or more cybersecurity policies provide cybersecurity network conformity with the compliance requirements; generate a cybersecurity workflow for the managed cybersecurity network, based on the one or more cybersecurity policies; and execute the cybersecurity workflow, using the SOAR platform.

The system 800 can include an accessing component 820. The accessing component 820 can include functions and instructions for accessing a plurality of cybersecurity threat protection applications, wherein the plurality of cybersecurity threat protection applications is deployed across a managed cybersecurity network, and wherein the cybersecurity threat protection applications are managed using a security orchestration, automation, and response (SOAR) platform. Threat protection applications can monitor, protect, and defend computer systems, data systems, data networks, handheld electronic devices, and so on against various types of malicious attacks. Malicious attacks can include malware attacks, hacking attacks, denial-of-service attacks (DOS), distributed denial-of-service attacks (DDOS), man-in-the-middle attacks, ransomware attacks, and so on. The threat protection applications can include antivirus and anti-phishing applications, tools for threat hunting and threat intelligence, identity verification, endpoint protection, and so on. The threat applications can further include firewalls and other blocking technology. The SOAR platform-based system enables the management and maintenance of the cybersecurity threat protection applications, coordinates the coverage of the applications across the network, and handles the analysis and mitigation of cybersecurity events as they occur. The SOAR platform can be used to manage threat protection processes, anti-threat technologies, and human expertise. The SOAR platform can centralize management of IT assets such as networks, processors, data storage elements, etc. The SOAR platform can provide threat alerts and can also provide contexts for the alerts. The SOAR platform can further automate responses to threats, adapt the responses using machine learning, and so on.

The system 800 can include an assimilating component 830. The assimilating component 830 can include functions and instructions for assimilating one or more cybersecurity network compliance requirements into the SOAR platform. In embodiments, the assimilating includes input from a compliance engine audit tool. The assimilating is performed by using an artificial intelligence (AI) user interface, wherein the AI user interface comprises a natural language AI user interface. The natural language AI user interface is embedded in the SOAR platform, wherein the natural language AI user interface is accessed by an application program interface (API) in the SOAR platform, wherein the natural language AI user interface is accessed using text and voice. The AI user interface is engaged by a cybersecurity representative. Natural language processing (NLP) can give computers the ability to understand, generate, manipulate, and respond to text and speech data in natural human languages. NLP uses rule-based and statistical models, as well as machine learning and deep learning techniques, to process and analyze large amounts of natural language data.

In embodiments, the compliance requirements can be based on one or more of compliance standards, regulatory requirements, company policy documents, and company incident response documents. The compliance requirements are based on company industry segment data. Governments at the federal, state, and local levels all strive to maintain cybersecurity regulations and policies for themselves and the private entities under their control. Regulatory bodies routinely publish and update policies and standards as cybersecurity threats increase and evolve. Audit companies specializing in cybersecurity work with internal audit and compliance departments to review, improve, and maintain cybersecurity standards, policies, and practices within companies large and small. Small businesses and private individuals can subscribe to cybersecurity services and purchase hardware and software that can help to mitigate the threats to their data, applications, and hardware, as well as their finances. With so many internal and external contributors to cybersecurity compliance requirements, IT departments are faced with significant challenges to interpret and assimilate all of them into their computer systems.

The system 800 can include a translating component 840. The translating component 840 can include functions and instructions for translating the one or more cybersecurity network compliance requirements into one or more cybersecurity policies, wherein the one or more cybersecurity policies provide cybersecurity network conformity with the compliance requirements. In embodiments, the translating is performed using machine learning (ML), wherein the ML is embedded in the SOAR platform, wherein the ML is trained by data gathered by one or more instantiations of the SOAR platform. The ML is accessed through an application program interface (API) in the SOAR platform. A machine learning (ML) model can be built using compliance and regulatory data from the natural language AI user interface and data from the cybersecurity threat protection applications input through one or more API. As mentioned above and throughout, inputting the various compliance, regulatory, and company policy statements regarding cybersecurity standards and responses into a natural language AI user interface allows the SOAR platform to interpret the requirements for the threat protection applications installed on the managed cybersecurity network. Input from the cybersecurity threat protection applications via the API allows the SOAR platform to interact with the applications and direct them to address cybersecurity events according to the compliance standards.

In embodiments, the translating component 840 further may include augmenting the translating using input from a cybersecurity representative, wherein the input is obtained using a natural language artificial intelligence user interface. The translating is further augmented using input from publicly available cybersecurity threat applications and company policy documentation. As cybersecurity events occur, either within a managed cybersecurity network or on other similar networks across the globe, incident reports in various forms are published by threat protection application vendors, regulatory agencies, auditors, watchdog agencies, internal audit and compliance departments, IT departments, and so on. All of this input can be used to update and refine the translation of network compliance requirements into policies, rules, and application settings. The input can be introduced into the machine learning model using one or more API and/or through the natural language AI user interface.

The system 800 can include a generating component 850. The generating component 850 can include functions and instructions for generating a cybersecurity workflow for the managed cybersecurity network, based on the one or more cybersecurity policies. In embodiments, the generating a cybersecurity workflow is performed using machine learning (ML), wherein the ML is embedded in the SOAR platform, wherein the ML is trained by data gathered by one or more instantiations of the SOAR platform. The machine learning model can generate a set of application policies, workflows, rules, and settings for each of the cybersecurity threat protection applications that direct the applications to respond to cybersecurity events in a manner that is consistent with the internal and external regulatory and compliance requirements for the network. The cybersecurity application policies can include details on which processes are to be handled by the SOAR platform and which processes are to be handled by the threat protection application directly, with status data to follow. The policies can include settings on how the application is to proceed in the event that the SOAR platform is unavailable, and so on.

The generating a cybersecurity workflow can be enabled by an embedded universal data layer comprising two or more cybersecurity threat protection application mappings. A first mapping of the two or more cybersecurity threat protection application mappings includes a transformation of outputs of each of the plurality of cybersecurity threat protection applications. A second mapping of the two or more cybersecurity threat protection application mappings includes a transformation of inputs of each of the plurality of cybersecurity threat protection applications. The universal data layer (UDL) can be used to "standardize" data provided to or generated by the cybersecurity threat protection applications. The applications can use different but similar terms to describe or label a threat, an action, a result, and so on. In embodiments, the SOAR platform can manage cybersecurity for a data network, based on data collected through the first UDL mapping and data transmitted through the second UDL mapping. Management of a data network, information technology (IT) system, and so on, can include executing one or more workflows. A workflow can access one or more threat detection applications, swap in and swap out applications, etc. In embodiments, SOAR platform managing cybersecurity can include graphical control of the plurality of cybersecurity threat protection applications.

The system 800 can include an executing component 860. The executing component 860 can include functions and instructions for executing the cybersecurity workflow, using the SOAR platform. In embodiments, the cybersecurity workflow includes managing one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and end-to-end incident lifecycle case management. The executing further comprises tagging a cybersecurity incident, based on the executing the cybersecurity workflow, further comprising tagging a cybersecurity incident, based on the executing the cybersecurity workflow. As cybersecurity events occur, the cybersecurity threat protection applications log events and report statuses and actions taken to the SOAR platform. The SOAR platform responds with additional requests, commands, communications, and so on as the event progresses. Reporting incident lifecycle applications, updating security personnel, receiving updates from vendors, modifying application behaviors, and so on can all be a part of the cybersecurity incident. As the incident progresses, mismatches with established compliance standards and internal policies specific to the enterprise or agency may be revealed, resulting in one or more tags being applied to the recording of the incident in the SOAR platform database. Defects in the application policies, processes, application, or staff responses can be tagged and reported to cybersecurity team members, audit, and/or compliance officers so that proper follow-up steps are taken, and the cybersecurity threat protection responses are brought into compliance. The event history logs, communications, and reporting can also be added to the ML model database in order to improve the responses and application policies in subsequent events.

The system 800 can include a computer program product embodied in a non-transitory computer readable medium for cybersecurity management, the computer program product comprising code which causes one or more processors to perform operations of: accessing a plurality of cybersecurity threat protection applications, wherein the plurality of cybersecurity threat protection applications are deployed across a managed cybersecurity network, and wherein the cybersecurity threat protection applications are managed using a security orchestration, automation, and response (SOAR) platform; assimilating one or more cybersecurity network compliance requirements into the SOAR platform; translating the one or more cybersecurity network compliance requirements into one or more cybersecurity policies, wherein the one or more cybersecurity policies provide cybersecurity network conformity with the compliance requirements; generating a cybersecurity workflow for the managed cybersecurity network, based on the one or more cybersecurity policies; and executing the cybersecurity workflow, using the SOAR platform.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams, infographics, and flowchart illustrations depict methods, apparatus, systems, and computer program products. The elements and combinations of elements in the block diagrams, infographics, and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:

accessing a man-in-the-middle cybersecurity threat protection application and a ransomware cybersecurity threat protection application wherein the man-in-the-middle cybersecurity threat protection application and the ransomware cybersecurity threat protection application are deployed across a managed cybersecurity network, and wherein the man-in-the-middle cybersecurity threat protection application and the ransomware cybersecurity threat protection application are managed using a security orchestration, automation, and response (SOAR) platform;

assimilating, based on receiving user inputs in an artificial intelligence (AI) user interface, one or more cybersecurity network compliance requirements into the SOAR platform;

translating, using a machine learning (ML) model, the one or more cybersecurity network compliance requirements into one or more cybersecurity policies, wherein the ML model was trained using data gathered by one or more instantiations of the SOAR platform, and wherein the one or more cybersecurity policies provide cybersecurity network conformity with the compliance requirements;

generating a cybersecurity workflow for the managed cybersecurity network, based on the one or more cybersecurity policies, wherein generating the cybersecurity workflow is based on applying an embedded universal data layer comprising a first mapping and a second mapping wherein:

the first mapping includes a transformation of outputs of the man-in-the-middle cybersecurity threat protection application and the ransomware cybersecurity threat protection application, the second mapping includes a transformation of inputs of the man-in-the-middle cybersecurity threat protection application and the ransomware cybersecurity threat protection application, and in response to applying the first mapping and the second mapping, the generated cybersecurity workflow is configured to automatically swap the man-in-the-middle cybersecurity threat protection application with the ransomware cybersecurity threat protection application without modifying the cybersecurity workflow or creating a new cybersecurity workflow to address the swapped application; and executing the cybersecurity workflow, using the SOAR platform, wherein:

inputs to the SOAR platform comprise the outputs of at least one of the man-in-the-middle cybersecurity threat protection application or the ransomware cybersecurity threat protection application that are transformed by the first mapping, and the inputs of at least one of the man-in-the-middle cybersecurity threat protection application or the ransomware cybersecurity threat protection application comprise outputs of the SOAR platform that are transformed by the second mapping.

2. The method of claim 1 wherein the compliance requirements are based on one or more of compliance standards, regulatory requirements, company policy documents, company incident response documents, and company industry segment standards.

3. The method of claim 1 wherein the AI user interface comprises a natural language AI user interface.

4. The method of claim 3 wherein the natural language AI user interface is embedded in the SOAR platform.

5. The method of claim 3 wherein the natural language AI user interface is accessed by an application program interface (API) in the SOAR platform.

6. The method of claim 3 wherein the natural language AI user interface is accessed by a user providing text input or voice input in the AI user interface.

7. The method of claim 1 wherein the ML model is embedded in the SOAR platform.

8. The method of claim 1 wherein the ML model is accessed through an API in the SOAR platform.

9. The method of claim 1 further comprising augmenting the translating based on input received from an endpoint device of a cybersecurity representative.

10. The method of claim 1 further comprising augmenting the translating based on input received from an endpoint device that includes publicly available cybersecurity threat applications.

11. The method of claim 1 further comprising augmenting the translating based on input received from an endpoint device that includes company policy documentation.

12. The method of claim 1 wherein generating the cybersecurity workflow is further based on applying another ML model to the one or more cybersecurity policies.

13. The method of claim 12 wherein the other ML model is embedded in the SOAR platform.

14. The method of claim 13 wherein the other ML model is trained using data gathered by the one or more instantiations of the SOAR platform.

15. The method of claim 1 further comprising tagging a cybersecurity incident based on executing the cybersecurity workflow.

16. The method of claim 15 wherein the tagging identifies a mismatch between the cybersecurity incident and a compliance requirement.

17. The method of claim 1 wherein the cybersecurity workflow includes instructions to perform operations comprising: managing one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and end-to-end incident lifecycle case management.

18. A system for cybersecurity management comprising:

one or more processors and memory storing instructions that, when executed, cause the one or more processors to perform operations comprising:

accessing a man-in-the-middle cybersecurity threat protection application and a ransomware cybersecurity threat protection application wherein the man-in-the-middle cybersecurity threat protection application and the ransomware cybersecurity threat protection application are deployed across a managed cybersecurity network, and wherein the man-in-the-middle cybersecurity threat protection application and the ransomware cybersecurity threat protection application are managed using a security orchestration, automation, and response (SOAR) platform;

assimilating, based on receiving user inputs in an artificial intelligence (AI) user interface, one or more cybersecurity network compliance requirements into the SOAR platform;

translating, using a machine learning (ML) model, the one or more cybersecurity network compliance requirements into one or more cybersecurity policies, wherein the ML model was trained using data gathered by one or more instantiations of the SOAR platform, and wherein the one or more cybersecurity policies provide cybersecurity network conformity with the compliance requirements;

generating a cybersecurity workflow for the managed cybersecurity network, based on the one or more cybersecurity policies, wherein generating the cybersecurity workflow is based on applying an embedded universal data layer comprising a first mapping and a second mapping wherein:

the first mapping includes a transformation of outputs of the man-in-the-middle cybersecurity threat protection application and the ransomware cybersecurity threat protection application, the second mapping includes a transformation of inputs of the man-in-the-middle cybersecurity threat protection application and the ransomware cybersecurity threat protection application, and in response to applying the first mapping and the second mapping, the generated cybersecurity workflow is configured to automatically swap the man-in-the-middle cybersecurity threat protection application with the ransomware cybersecurity threat protection application without modifying the cybersecurity workflow or creating a new cybersecurity workflow to address the swapped application; and executing the cybersecurity workflow, using the SOAR platform, wherein:

inputs to the SOAR platform comprise the outputs of at least one of the man-in-the-middle cybersecurity threat protection application or the ransomware cybersecurity threat protection application that are transformed by the first mapping, and the inputs of at least one of the man-in-the-middle cybersecurity threat protection application or the ransomware cybersecurity threat protection application comprise outputs of the SOAR platform that are transformed by the second mapping.

19. The system of claim 18 wherein the compliance requirements are based on one or more of compliance standards, regulatory requirements, company policy documents, company incident response documents, and company industry segment standards.

20. The system of claim 18 wherein the AI user interface comprises a natural language AI user interface.

* * * * *